US008270833B2

(12) United States Patent
Lin et al.

(10) Patent No.: US 8,270,833 B2
(45) Date of Patent: Sep. 18, 2012

(54) PASSIVE OPTICAL NETWORK SYSTEM SUPPORTING WIRELESS COMMUNICATION

(75) Inventors: Yu-Min Lin, Hsinchu (TW); Po-Lung Tien, Hsinchu County (TW); Maria C. Yuang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 384 days.

(21) Appl. No.: 12/504,322

(22) Filed: Jul. 16, 2009

(65) Prior Publication Data
US 2010/0239253 A1 Sep. 23, 2010

(30) Foreign Application Priority Data

Mar. 20, 2009 (TW) ................................ 98109238 A

(51) Int. Cl.
*H04B 10/00* (2006.01)
(52) U.S. Cl. .......................................... 398/72; 398/115
(58) Field of Classification Search ............... 398/66–73, 398/115–117
See application file for complete search history.

(56) References Cited

U.S. PATENT DOCUMENTS

| | | | | |
|---|---|---|---|---|
| 5,572,612 A * | 11/1996 | Delavaux et al. | ................ | 385/24 |
| 5,615,290 A * | 3/1997 | Harasawa et al. | ................ | 385/24 |
| 5,793,908 A * | 8/1998 | Mizuochi et al. | ................ | 385/24 |
| 5,844,705 A * | 12/1998 | Rutledge | ........................ | 398/66 |
| 5,880,865 A * | 3/1999 | Lu et al. | ........................ | 398/72 |
| 6,577,414 B1 * | 6/2003 | Feldman et al. | ................ | 398/43 |
| 6,684,030 B1 * | 1/2004 | Taylor et al. | ..................... | 398/59 |
| 6,788,899 B2 * | 9/2004 | Way | ................................ | 398/83 |
| 6,895,185 B1 * | 5/2005 | Chung et al. | .................... | 398/72 |
| 6,996,138 B2 * | 2/2006 | Jung et al. | ....................... | 372/18 |
| 7,054,522 B1 * | 5/2006 | Han et al. | ........................ | 385/24 |
| 7,085,497 B2 * | 8/2006 | Tiemann et al. | ............... | 398/107 |
| 7,095,958 B1 * | 8/2006 | Woodward | ....................... | 398/72 |
| 7,298,974 B2 * | 11/2007 | Tanobe et al. | ................... | 398/63 |
| 7,330,656 B2 * | 2/2008 | Lee et al. | ......................... | 398/78 |
| 7,340,170 B2 * | 3/2008 | Park et al. | ........................ | 398/67 |
| 7,349,634 B2 * | 3/2008 | Sasai et al. | ..................... | 398/115 |
| 7,359,637 B2 * | 4/2008 | Kim et al. | ........................ | 398/72 |
| 7,366,150 B2 * | 4/2008 | Lee et al. | ....................... | 370/338 |
| 7,379,669 B2 * | 5/2008 | Kim | ................................. | 398/74 |

(Continued)

OTHER PUBLICATIONS

Crisp, Michael J., "Uplink and Downlink Coverage Improvements of 802.11g Signals Using a Distributed Antenna Network," Journal of Lightwave Technology, vol. 25, No. 11, Nov. 2007, pp. 3388-3395.

(Continued)

*Primary Examiner* — Agustin Bello
(74) *Attorney, Agent, or Firm* — Morris Manning & Martin LLP; Tim Tingkang Xia, Esq.

(57) ABSTRACT

A passive optical network (PON) system supporting wireless communication includes an optical line terminal (OLT) configured on a central office, an optical distribution network (ODN), and a plurality of optical network units (ONUs) respectively configured on user ends. The ODN is connected to the OLT and the ONUs in a one-to-many manner. The OLT sends a downstream optical signal to the ODN, and receives an upstream optical signal. The ODN circularly guides the optical signal to each ONU. Each ONU receives and reflects the downstream optical signal, processes the received downstream optical signal, receives and processes the upstream optical signal, carries an electrical signal to be uploaded into the upstream optical signal, and carries data received by a remote antenna into the upstream optical signal. Through the above architecture, the PON system supports wireless communication.

29 Claims, 18 Drawing Sheets

U.S. PATENT DOCUMENTS

| | | | |
|---|---|---|---|
| 7,394,984 B1* | 7/2008 | Woodward | 398/72 |
| 7,421,203 B2* | 9/2008 | Kim et al. | 398/59 |
| 7,433,594 B2* | 10/2008 | Takachio et al. | 398/4 |
| 7,440,699 B1* | 10/2008 | Stewart et al. | 398/116 |
| 7,519,297 B2* | 4/2009 | Hahin et al. | 398/115 |
| 7,539,419 B2* | 5/2009 | Sasai et al. | 398/115 |
| 7,548,695 B2* | 6/2009 | Wake | 398/71 |
| 7,570,887 B2* | 8/2009 | Rohrer et al. | 398/73 |
| 7,590,354 B2* | 9/2009 | Sauer et al. | 398/115 |
| 7,616,892 B2* | 11/2009 | Suzuki et al. | 398/72 |
| 7,650,112 B2* | 1/2010 | Utsumi et al. | 455/11.1 |
| 7,660,531 B2* | 2/2010 | Lee et al. | 398/115 |
| 7,715,722 B1* | 5/2010 | Hoke et al. | 398/115 |
| 7,738,167 B2* | 6/2010 | Kim et al. | 359/344 |
| 7,769,290 B2* | 8/2010 | Smith | 398/5 |
| 7,773,887 B2* | 8/2010 | Lee et al. | 398/115 |
| 7,783,198 B2* | 8/2010 | Jung et al. | 398/82 |
| 7,796,891 B2* | 9/2010 | Lee et al. | 398/115 |
| 7,848,654 B2* | 12/2010 | Sauer et al. | 398/115 |
| 7,865,081 B1* | 1/2011 | Woodward | 398/72 |
| 7,903,979 B2* | 3/2011 | Lee et al. | 398/168 |
| 7,965,939 B2* | 6/2011 | Gadkari et al. | 398/67 |
| 7,991,161 B2* | 8/2011 | Chen | 380/272 |
| 8,019,221 B2* | 9/2011 | Zancewicz | 398/72 |
| 8,023,824 B2* | 9/2011 | Yu et al. | 398/72 |
| 2002/0018260 A1* | 2/2002 | Kisovec et al. | 359/124 |
| 2003/0161637 A1* | 8/2003 | Yamamoto et al. | 398/167.5 |
| 2004/0008989 A1* | 1/2004 | Hung | 398/69 |
| 2004/0101305 A1* | 5/2004 | Jung et al. | 398/71 |
| 2005/0254820 A1* | 11/2005 | Zhou et al. | 398/83 |
| 2005/0259988 A1* | 11/2005 | Jung et al. | 398/72 |
| 2006/0093359 A1* | 5/2006 | Lee et al. | 398/70 |
| 2007/0019959 A1* | 1/2007 | Retnasothie et al. | 398/115 |
| 2007/0189772 A1* | 8/2007 | Hyun et al. | 398/71 |
| 2008/0063397 A1* | 3/2008 | Hu et al. | 398/43 |
| 2008/0131125 A1* | 6/2008 | Byoung Whi et al. | 398/72 |
| 2008/0145056 A1* | 6/2008 | Boldi et al. | 398/96 |
| 2008/0219670 A1* | 9/2008 | Kim et al. | 398/115 |
| 2008/0260388 A1* | 10/2008 | Kim et al. | 398/115 |
| 2008/0279556 A1* | 11/2008 | Yu et al. | 398/72 |
| 2009/0047016 A1* | 2/2009 | Bernard et al. | 398/43 |
| 2009/0202241 A1* | 8/2009 | Yu et al. | 398/58 |
| 2009/0274462 A1* | 11/2009 | Yu | 398/68 |
| 2010/0098433 A1* | 4/2010 | Boyd et al. | 398/155 |
| 2010/0142955 A1* | 6/2010 | Yu et al. | 398/72 |
| 2010/0150557 A1* | 6/2010 | Mysore et al. | 398/68 |
| 2010/0215368 A1* | 8/2010 | Qian et al. | 398/67 |
| 2010/0239253 A1* | 9/2010 | Lin et al. | 398/63 |
| 2011/0158649 A1* | 6/2011 | Hari | 398/66 |
| 2011/0158653 A1* | 6/2011 | Mazed | 398/140 |
| 2011/0188858 A1* | 8/2011 | Kim et al. | 398/66 |
| 2011/0188859 A1* | 8/2011 | Wen et al. | 398/79 |
| 2011/0211839 A1* | 9/2011 | Lee et al. | 398/79 |

OTHER PUBLICATIONS

Bakaul, Masuduzzaman, "Hybrid Multiplexing of Multiband Optical Access Technologies Toward an Integrated DWDM Network," IEEE Photonics Technology Letters, vol. 18, No. 21, Nov. 1, 2006, pp. 2311-2313.

Qian, D. et al., "10-Gb/s OFDMA-PON for Delivery of Heterogeneous Services," NEC Laboratories America, Inc., Princeton, NJ, 2008, 3 pages.

\* cited by examiner

PASSIVE OPTICAL NETWORK SYSTEM SUPPORTING WIRELESS COMMUNICATION

CROSS-REFERENCE TO RELATED APPLICATIONS

This non-provisional application claims priority under 35 U.S.C. §119(a) on Patent Application No(s). 098109238 filed in Taiwan, R.O.C. on Mar. 20, 2009 the entire contents of which are hereby incorporated by reference.

TECHNICAL FIELD

The present disclosure relates to an optical multiplex system, and more particularly to a passive optical network (PON) system supporting wireless communication.

BACKGROUND

A broadband wireless access (BWA) technique is a technique for providing high-speed transmission for wireless network and data network in a wide region. After a worldwide interoperability for microwave access (WiMAX) standard (IEEE 802.16d/e) has been issued, the transmission speed of the BWA technique is greatly increased.

FIG. 1 is a schematic architectural view of a system between a central office and base stations of a conventional BWA system. Referring to FIG. 1, in the BWA technique, during the hardware construction, dedicated lines 93a and 93b must be respectively configured between a central office 90 and a plurality of base stations 92a and 92b. The architecture shown in FIG. 1 is a point-to-multipoint (one-to-many) architecture.

A passive optical network (PON) is a point-to-multipoint optical fiber network system, which is usually used to connect an optical line terminal (OLT) located on the central office provided by a service provider and a plurality of optical network units (ONUs) (also called optical network terminals at user ends) near the user ends. FIG. 2 is a schematic architectural view of a system between an OLT 94 and ONUs 96a and 96b of a conventional PON system. Referring to FIG. 2, in the PON, the optical splitting is realized by using a passive element 97 (an un-powered element). Such passive optical splitting element is commonly an optical splitter.

Through comparing FIG. 1 with FIG. 2, it can be clearly known that, the PON system architecture and the BWA system architecture both belong to the one-to-many configuration architecture.

Next, the infrastructure of the optical fiber network is constructed much earlier than that of the BWA network, so that a part of the people involved in the broadband wireless industry cooperate with the PON industry, and thus, base stations of the BWA network are disposed on the positions of the ONUs of the PON, and the central office is disposed on the position of the OLT of the PON. The optical fiber network and the BWA network both transfer data at the same time by adopting the same PON. In this manner, the bandwidth of the PON is fully utilized.

The above technique for providing wireless communication in the PON has been disclosed in US Patent Publication No. 2008/0063397, filed on Mar. 13, 2008, and entitled "System and Method for Providing Wireless over a Passive Optical Network". In addition, similar techniques may be known with reference to the following papers:

The paper issued by D. Qian, J. Hu, P. Ji, T. Wang, and M. Cvijetic (with reference to "10-Gb/s OFDMA-PON for Delivery of Heterogeneous Services", OFC 2008), the paper issued by M. Bakaul, A. Nirmalathas, C. Lim, D Novak, and R. Waterhouse (with reference to "Hybrid Multiplexing of Multiband Optical Access Technologies Towards an Integrated DWDM Network", IEEE Photonics Technology Letters, vol. 18, no. 21, November 2006, pp. 2311-2313), and the paper issued by M. Crisp, S. Li, A. Watts, R. Penty, and I. White (with reference to "Uplink and Downlink Coverage Improvements of 802.11g Signals Using a Distributed Antenna Network", IEEE Journal of Lightwave Technology, vol. 25, no. 11, November 2007, pp. 3388-3395).

SUMMARY

In view of the above demand of combining the wireless transmission with the optical network communication and making full use of the constructed optical fiber network infrastructure, the present invention is a PON system supporting wireless communication, which is capable of supporting both wireless communication and optical communication with a low optical transmission loss and a simple hardware architecture.

According to an exemplary embodiment, a PON system supporting wireless communication comprises an OLT, an optical distribution network (ODN), and a plurality of ONUs. The OLT is configured on a central office and is used to send a downstream optical signal and receive an upstream optical signal. The ODN has an optical circulator assembly and first, second, ... $n^{th}$ optical fibers, in which n is a positive integer greater than 2. The optical fibers are connected to the optical circulator assembly in sequence. The first optical fiber is connected to the OLT and transmits the optical signals, and the optical circulator assembly guides the optical signals transmitted from one of the optical fibers to the next optical fiber. The ONUs are respectively configured on user ends and respectively connected to the second, ... $n^{th}$ optical fibers. Each ONU receives the optical signals from the corresponding second, ... $n^{th}$ optical fiber, generates the upstream optical signal, and then transmits the upstream optical signal back to the corresponding second, ... $n^{th}$ optical fiber. Each ONU corresponding to the second, ... $(n-1)^{th}$ optical fiber processes the received downstream optical signal and transmits the processed downstream optical signal back to the corresponding second, ... $(n-1)^{th}$ optical fiber. At least one of the user ends has a remote antenna. The ONU configured on the user end having the remote antenna combines data received by the remote antenna with the upstream optical signal.

According to another exemplary embodiment, a passive optical network (PON) system supporting wireless communication comprises an OLT, an ODN and a plurality of ONUs. The OLT sends a downstream optical signal and receiving an upstream optical signal. The ODN has an optical circulator assembly and n optical fibers, in which n is a positive integer greater than 2. The optical fibers are connected to the optical circulator assembly in sequence. The first optical fiber is connected to the OLT and transmits the optical signals. The ONUs are connected to the second, ... $n^{th}$ optical fibers respectively. Each of the ONUs receives and processes the optical signals from the optical fiber correspondingly connected to the ONU, generates the upstream optical signal, and then transmits the upstream optical signal back to the corresponding second, ... $n^{th}$ optical fiber. At least one of the ONUs is configured with a remote antenna. The ONU configured with the remote antenna combines data received by the remote antenna with the upstream optical signal.

Through the structure of the PON system supporting wireless communication, the optical circulator assembly guides the optical signals, and the ONUs are appropriately designed, so that the PON system can support the wireless communication, and the detailed structure of the ONUs can be adjusted according to the situation whether each user end needs to support the wireless communication or not. Therefore, the PON system is more convenient and flexible in applications. In addition, no optical splitter is adopted in the ODN according to the present invention, such that an intensity of the downstream optical signal sent from the OLT is not split into a plurality of portions by the optical splitter, and thus, the OLT is enabled to select a luminous element (laser) with a moderate luminous intensity, thereby lowering the specification of the selected parts. Furthermore, the PON system may adopts one wavelength of the upstream optical signal and one wavelength of the downstream optical signal, such that widely applied luminous elements (lasers) can be used, thereby lowering the entire construction cost.

BRIEF DESCRIPTION OF THE DRAWINGS

The present invention will become more fully understood from the detailed description given herein below for illustration only, and thus is not limitative of the present invention, and wherein.

DETAILED DESCRIPTION

The above descriptions of the disclosure and the following descriptions of the embodiments are merely intended to exemplify and explain the spirits and principles of the invention, and offer further explanations on the claims of the invention.

Firstly, the exemplary embodiments disclosed is a PON system supporting wireless communication. The wireless communication supported by the exemplary embodiments may be, but are not limited to, frequency modulation, amplitude modulation, general packet radio service (GPRS), or WiMAX, etc. In the following descriptions, the WiMAX is taken as an example.

Various optical network protocols, for example, but not limited to, Ethernet, ATM, and SONET, can run on the PON system architecture provided according to the exemplary embodiments. In the following descriptions, an orthogonal frequency division multiple access (OFDMA)-based Gigabit PON (OFDMA-GPON) is taken as an example. However, the scope of the invention is not limited here, and any optical access network (or data access network) can be applied.

Figure 1:
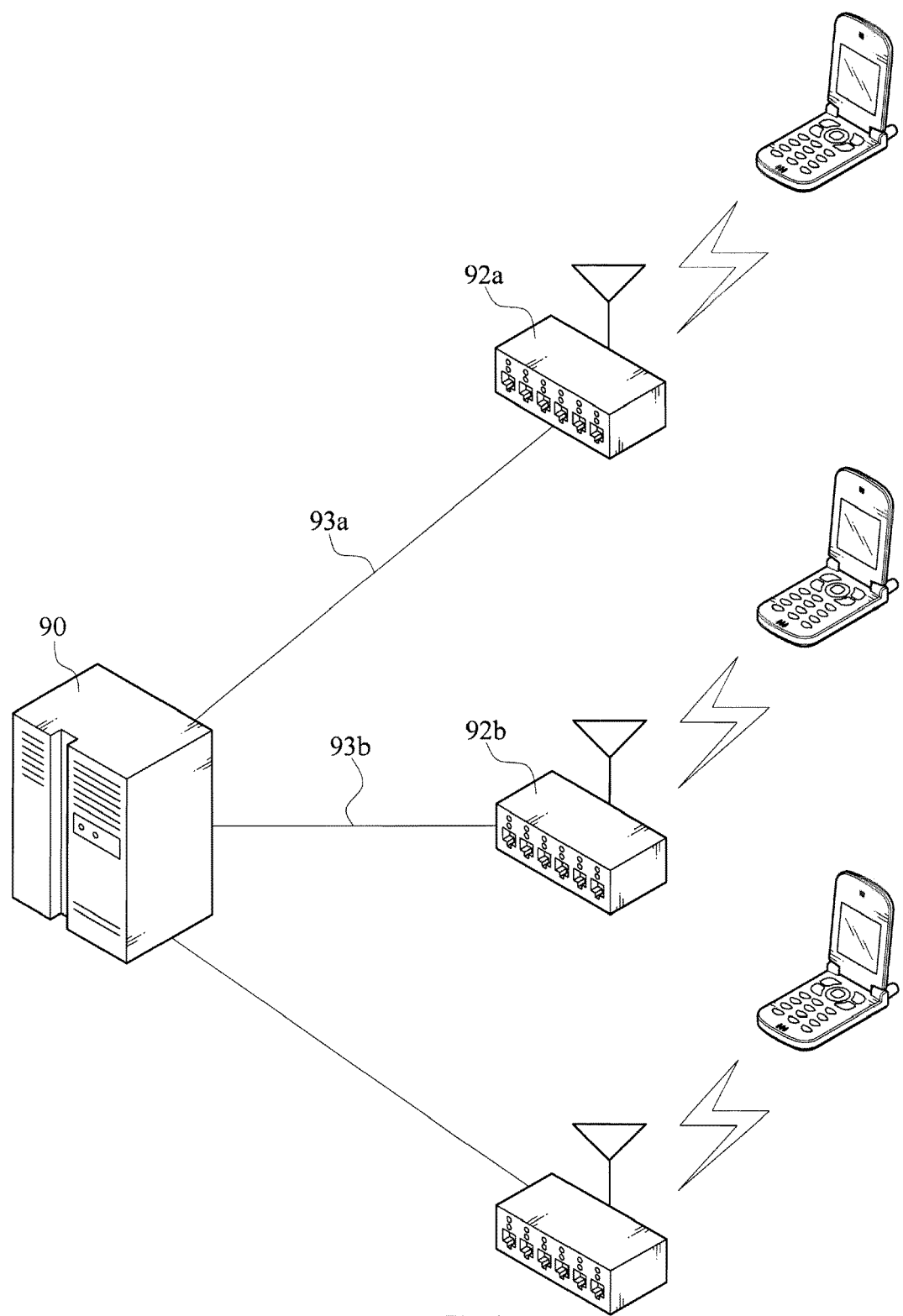
FIG. 1 is a schematic architectural view of a system between a central office and base stations of a conventional BWA system.
Figure 2:
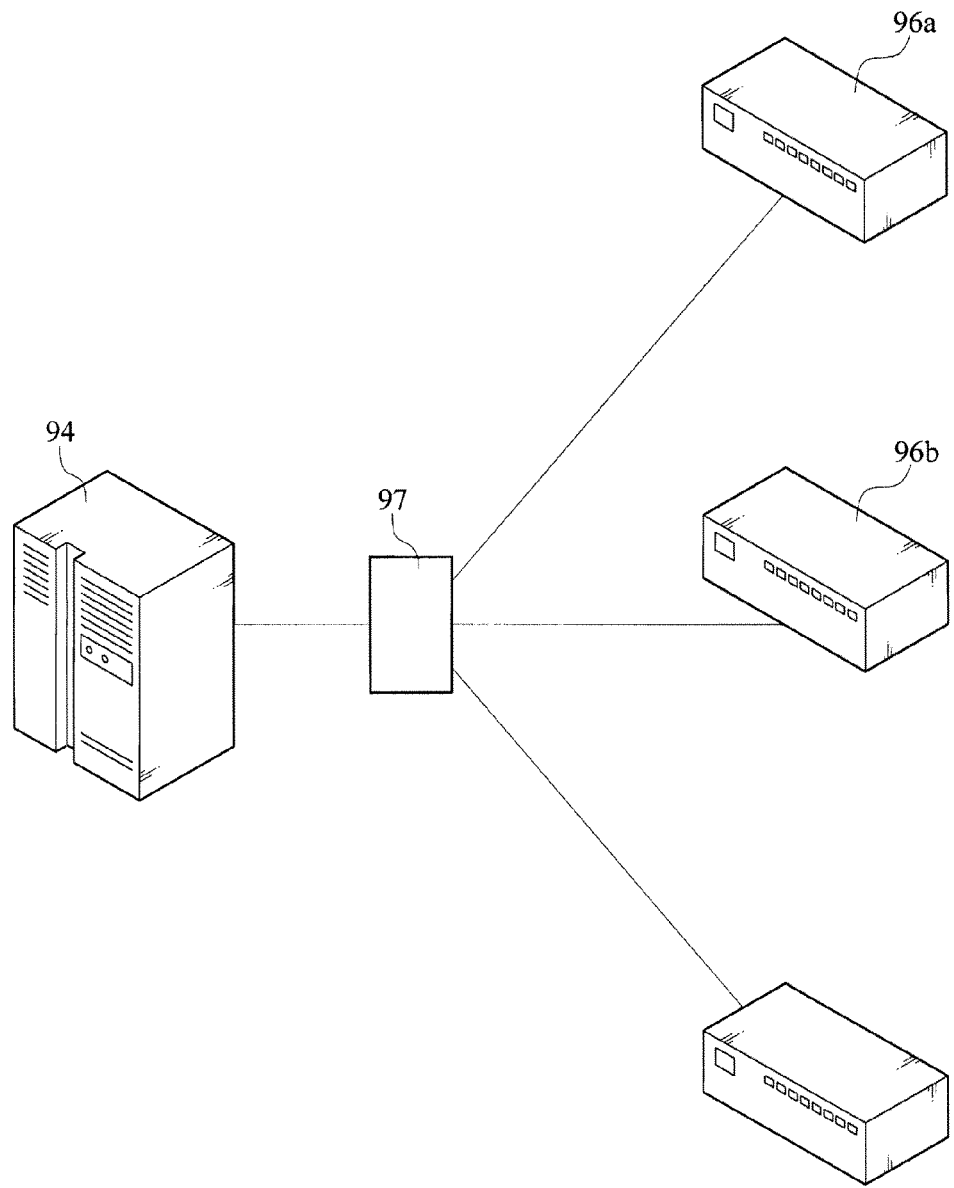
FIG. 2 is a schematic architectural view of a system between an OLT and ONUs of a conventional PON system.
Figure 3:
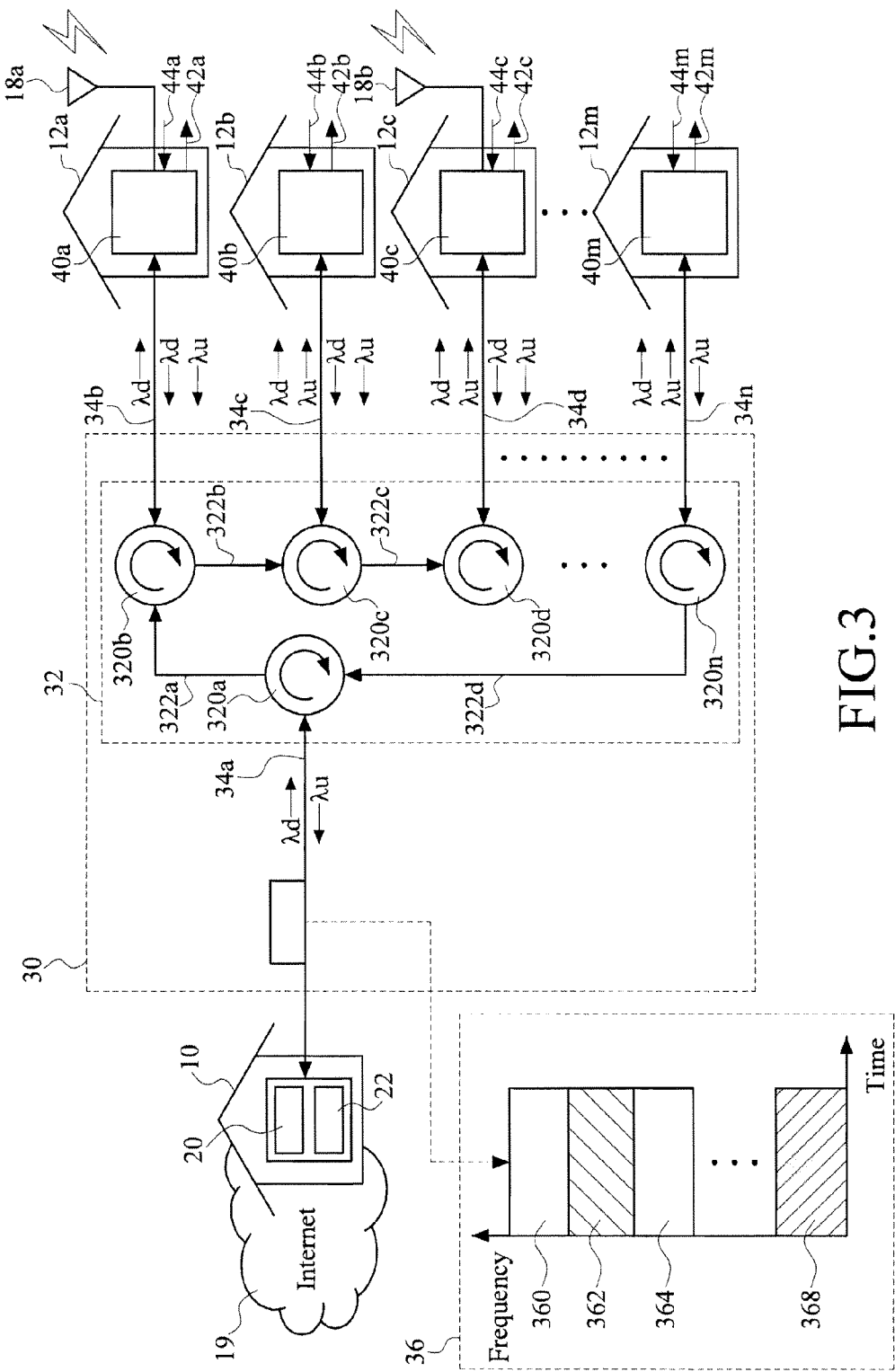
FIG. 3 is a schematic architectural view of a PON system supporting wireless communication according to an embodiment.

FIG. 3 is a schematic architectural view of a PON system supporting wireless communication according to an embodiment. Referring to FIG. 3, as known from the drawing that, the PON system supporting wireless communication is used to form a communication network between a central office 10 and a plurality of user ends (base stations) 12a, 12b, 12c, and 12m. A part of the user ends 12a and 12c have remote antennas 18a and 18b, that is to say, at least one of the user ends 12a and 12c has a remote antenna 18a or 18b.

The PON system supporting wireless communication comprises an OLT 20, an ODN 30, and a plurality of ONUs 40a, 40b, 40c, and 40m.

The OLT 20 may be, but is not limited to, an OLT 20 supporting the OFDMA-GPON. The OLT 20 is configured on the central office 10. The ONUs 40a, 40b, 40c, and 40m are respectively configured on the user ends 12a, 12b, 12c, and 12m. A base station 22 for transmitting/receiving WiMAX wireless signals and a device for connecting to Internet 19 are further configured on the central office 10. The OLT 20 is a wireline access interface for forming a communication link with the base station 22, the user ends 12a, 12b, 12c, and 12m, and the Internet 19. The OLT 20 transfers a signal from the base station 22 and the Internet 19 as a downstream optical signal $\lambda_d$ to the ODN 30, and decodes and delivers an upstream optical signal $\lambda_u$ from the ODN 30 to the corresponding base station 22 or the Internet 19.

The Internet 19 may be a public switched telephone network (PSTN).

The OLT 20 forms point-to-multipoint links with the plurality of ONUs 40a, 40b, 40c, and 40m through the ODN 30. The downstream optical signal $\lambda_d$ sent from the OLT 20 or the upstream optical signal $\lambda_u$ received by the OLT 20 is an OFDM signal 36. As seen from FIG. 3 that, a transverse axis of the OFDM signal 36 is time, and a longitudinal axis is frequency. At the same time point (that is, at the same vertical line), the transmitted data comprises a plurality of channels 360, 362, 364, and 368 (that is, frequency sections). Each channel 360, 362, 364, or 368 may be respectively used for data transmission. For example, in FIG. 3, the channels 360 and 364 are used to transmit digital data (the channels 360 and 364 are data channels). The channel 362 is used to transfer wireless data (the channel 362 is a radio frequency (RF)

channel). The channel 368 is used to transfer control data (the channel 368 is a control channel). The type of the data transferred by each channel 360, 362, 364, or 368 may be predetermined. Therefore, as known from the above descriptions, the downstream optical signal $\lambda_d$ is transmitted by adopting only one optical wavelength. Similarly, the above downstream optical signals $\lambda_d$ may also adopt one wavelength for being transmitted, rather than adopting a density wavelength division multiplexing (DWDM) technique. In this manner, the special laser required by the DWDM may be omitted and the wavelength of the light rays sent from the laser does not need to be accurately controlled, such that the cost is greatly lowered. For example, in this embodiment, a wavelength of the upstream optical signal $\lambda_u$ is different from a wavelength of the downstream optical signal $\lambda_d$, in which the wavelength of the downstream optical signal $\lambda_d$ is, for example, but not limited to, 1490 nm, and the wavelength of the upstream optical signal $\lambda_u$ is, for example, but not limited to, 1310 nm.

The channel for the upstream optical signal $\lambda_u$ and the channel for the downstream optical signal $\lambda_d$ are both predetermined and are preferably defined as the same.

The ODN 30 has an optical circulator assembly 32 and first, second, ... $n^{th}$ optical fibers 34a, 34b, 34c, and 34n, in which n is a positive integer greater than 2. The optical fibers 34a, 34b, 34c, and 34n are connected to the optical circulator assembly 32 in sequence. The first optical fiber is connected to the OLT 20 and transmits the optical signals $\lambda_u$ and $\lambda_d$, and the optical circulator assembly 32 guides the optical signals $\lambda_u$ and $\lambda_d$ transmitted from one of the optical fibers (for example, 34a) to the next optical fiber (accordingly, the next optical fiber of 34a is 34b).

The optical circulator assembly 32 comprises first, second, ... $n^{th}$ circulators 320a, 320b, 320c, and 320n and n optical guides 322a, 322b, 322c, and 322d. The first, second, ... $n^{th}$ circulators 320a, 320b, 320c, and 320n are ring-jointed with each other by the n optical guides 322a, 322b, 322c, and 322d. Outer sides of the first, second, ... $n^{th}$ circulators 320a, 320b, 320c, and 320n are opto-connected to the corresponding first, second, ... $n^{th}$ optical fibers 34a, 34b, 34c, and 34n respectively. Each circulator 320a, 320b, 320c, or 320n guides the optical signals from one of the opto-connections (for example, one opto-connection 34a of the circulator 320a) to the next opto-connection (accordingly, the next opto-connection of 34a is 322a).

As known from the above that, the circulator 320a, 320b, 320c, or 320n guides the optical signals from one of the optical fibers to the next optical fiber, in which the next optical fiber is the next optical fiber in a clockwise direction (for example, in FIG. 3), but the invention is not limited here.

The operations of the circulators 320a, 320b, 320c, and 320n are demonstrated by taking the circulator 320b as an example. The light rays received by the circulator 320b are guided to the next opto-connection in the clockwise direction as shown in the drawing. That is to say, the light rays from the optical guide 322a are guided to the optical fiber 34b for being output. The light rays from the optical fiber 34b are guided to the optical guide 322b for being output.

The above opto-connection refers to a connection formed by using materials where the light rays can be transmitted thereon, for example, a connection formed by using the materials, for example, optical fibers, optical guide pipes, optical waveguides, and the like.

The circulators 320a, 320b, 320c, and 320n are ring-jointed with each other by the n opto-connections 322a, 322b, 322c, and 322d, which means that the first, second, ... $n^{th}$ circulators 320a, 320b, 320c, and 320n are opto-connected in sequence, and the $n^{th}$ circulator 320n is opto-connected to the first circulator 320a. That is to say, the first and second circulators 320a and 320b are connected by the first opto-connection 322a, the second and third circulators 320b and 320c are connected by the second opto-connection 322b. Accordingly, the $n^{th}$ and first circulators 320n and 320a are connected by the $n^{th}$ opto-connection 322d. The connecting here refers to the opto-connecting, that is, the connecting realized by using optical fibers, but the two parts are opto-connected to transmit light rays. The opto-connection may adopt, but not limited to, optical fibers, optical guide pipes, or optical waveguides.

The outer sides of the first, second, ... $n^{th}$ circulators 320a, 320b, 320c, and 320n refer to outer sides of the circulators 320a, 320b, 320c, and 320n after the circulators 320a, 320b, 320c, and 320n are ring-jointed by the opto-connections 322a, 322b, 322c, and 322d. Taking the circulator 320a for example, the position of the optical fiber 34a is the outer side of the circulator 320a. Similarly, the position of the optical fiber 34b is the outer side of the circulator 320b, and so forth.

Referring to FIG. 3, as seen from FIG. 3, the plurality of ONUs 40a, 40b, 40c, and 40m are respectively configured on the plurality of user ends 12a, 12b, 12c, and 12m. The number of the ONUs and the user ends is m, in which m=n−1. The ONUs 40a, 40b, 40c, and 40m are respectively connected to the second, ... $n^{th}$ optical fibers 34b, 34c, and 34n. Each ONU 40a, 40b, 40c, or 40m receives the optical signals $\lambda_u$ and $\lambda_d$ from the corresponding second, ... $n^{th}$ optical fiber 34b, 34c, or 34n. Each ONU 40a, 40b, 40c, or 40m corresponding to the second, ... $(n-1)^{th}$ optical fiber 34b, 34c, or 34n processes the received downstream optical signal $\lambda_d$ and transmits the processed downstream optical signal $\lambda_d$ back to the corresponding second, ... $(n-1)^{th}$ optical fiber 34b, 34c, or 34n. Each ONU 40a, 40b, 40c, or 40m further generates the upstream optical signal $\lambda_u$ and transmits the upstream optical signal $\lambda_u$ back to the corresponding second, ... $n^{th}$ optical fiber 34b, 34c, or 34n. The ONUs 40a and 40c configured on the user ends 12a and 12c having the remote antennas 18a and 18b convert the data received by the remote antennas 18a and 18b and combine the data with the upstream optical signal $\lambda_u$.

After being received and processed by each ONU 40a, 40b, 40c, or 40m, the downstream optical signal $\lambda_d$ is transmitted back to the corresponding second, ... $n^{th}$ optical fiber 34b, 34c, or 34n. For example, the ONU 40a receives and processes a downstream optical signal $\lambda_d$ from the optical fiber 34b, and then transmits the processed downstream optical signal $\lambda_d$ back to the optical fiber 34b. The downstream optical signal $\lambda_d$ being transmitted back is the same as the received downstream optical signal $\lambda_d$. When processing the received downstream optical signal $\lambda_d$, each ONU 40a, 40b, 40c, or 40m demodulates the optical signals of the ONU 40a, 40b, 40c, or 40m and transmits the optical signals down to 42a, 42b, 42c, or 42m.

Therefore, the OLT 20 sends a downstream optical signal $\lambda_d$ to the ODN 30, and the downstream optical signal $\lambda_d$ passes through the first optical fiber 34a, the first circulator 320a, the first optical guide 322a, the second circulator 320b, the second optical fiber 34b in sequence, so as to reach the ONU 40a corresponding to the second optical fiber 34b. The ONU 40a receives and processes the downstream optical signal $\lambda_d$. Next, the ONU 40a further combines an electrical signal to be uploaded 44a with the data received by the remote antenna 18a to generate the upstream optical signal $\lambda_u$, and then transmits the upstream optical signal $\lambda_u$ back to the second optical fiber 34b. That is to say, the optical signals transmitted back to the second circulator 320b through the second optical fiber 34b comprise the downstream optical signal $\lambda_d$ and the upstream optical signal $\lambda_u$.

After receiving the downstream optical signal $\lambda_d$ and the upstream optical signal $\lambda_u$, the second circulator 320b guides the downstream optical signal $\lambda_d$ and the upstream optical signal $\lambda_u$ to the optical guide 322b. Then, the downstream optical signal $\lambda_d$ and the upstream optical signal $\lambda_u$ pass through the third circulator 320c and the third optical fiber 34c in sequence and are guided to the ONU 40b corresponding to the third optical fiber 34c.

The ONU 40b receives, processes, and transmits back the downstream optical signal $\lambda_d$. The ONU 40b combines the received upstream optical signal $\lambda_u$ with an electrical signal to be uploaded 44b to generate a new upstream optical signal $\lambda_u$, and transmits the new upstream optical signal $\lambda_u$ back to the third circulator 320c. Therefore, the optical signals transmitted from the ONU 40b back to the third circulator 320c comprise the downstream optical signal $\lambda_d$ and the upstream optical signal $\lambda_u$.

Through the third and fourth circulators 320c and 320d, the optical signals $\lambda_d$ and $\lambda_u$ from the ONU 40b are transferred to the ONU 40c. The ONU 40c performs the same processing on the received downstream optical signal $\lambda_d$ as that mentioned above, so it is not described repeatedly. After receiving the upstream optical signal $\lambda_u$, the ONU 40c combines the upstream optical signal $\lambda_u$ with an electrical signal to be uploaded 44c and the data received by the remote antenna 18b to generate another new upstream optical signal $\lambda_u$, and then transmits the new upstream optical signal $\lambda_u$ back to the fourth circulator 320d.

As known from the above descriptions that, the functions of the ONUs 40a, 40b, 40c, and 40m are similar. Specifically, each ONU needs to process the downstream optical signal $\lambda_d$, transmit the data of each ONU itself down to 42a, 42b, 42c, or 42m, and transmit the downstream optical signal $\lambda_d$ back. In addition, as for the upstream optical signal $\lambda_u$, each ONU needs to combine an electrical signal to be uploaded 44a, 44b, 44c, or 44m with the received upstream optical signal $\lambda_u$. If the ONU 40a or 40c is configured with the remote antenna 18a or 18b, the ONU 40a or 40c further combines the data received by the remote antenna 18a or 18b with the upstream optical signal $\lambda_u$.

The last ONU 40m does not have a next ONU, so that the last ONU 40m does not need to transmit the upstream optical signal $\lambda_u$ back to the $n^{th}$ optical fiber 34n, and the remaining functions are the same as that of the ONU 40b, which thus are not described repeatedly here.

Figure 4A:
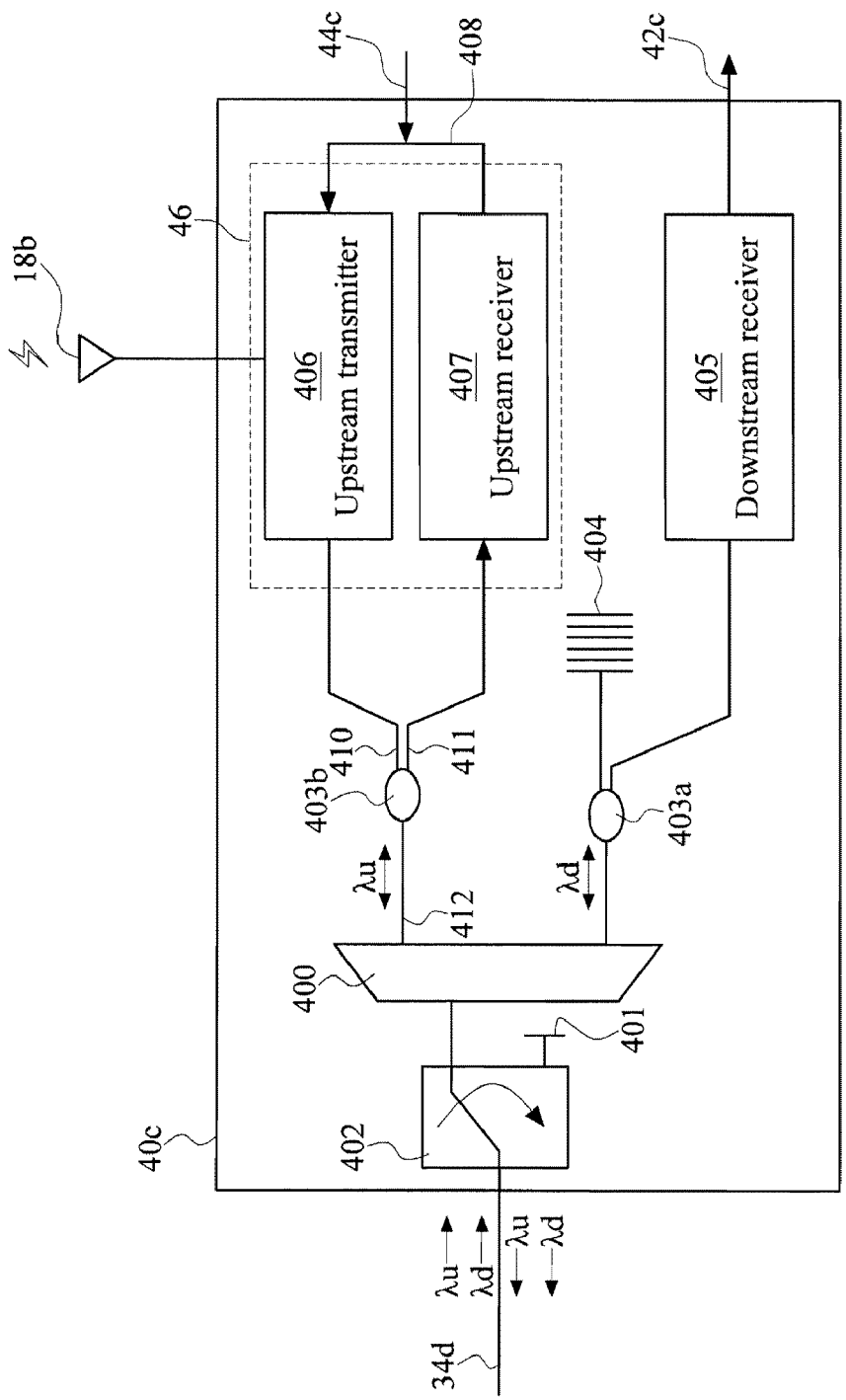
FIG. 4A is a schematic architectural view of an embodiment of an ONU.

FIG. 4A is a schematic architectural view of an embodiment of an ONU. Referring to FIG. 4A, as seen from FIG. 4A that, the ONU 40c comprises a CWDM 400 for splitting the received optical signals $\lambda_u$ and $\lambda_d$ into the upstream optical signal $\lambda_u$ and the downstream optical signal $\lambda_d$.

The ONU 40c further comprises an optical switch 402 and a first reflecting mirror 401 located before a receiving end of the CWDM 400. The optical switch 402 receives the optical signals $\lambda_u$ and $\lambda_d$. Upon being powered on, the optical switch 402 guides the optical signals $\lambda_u$ and $\lambda_d$ to the CWDM 400. Upon being powered off, the optical switch 402 guides the optical signals $\lambda_u$ and $\lambda_d$ to the first reflecting mirror 401. The first reflecting mirror 401 reflects the optical signals $\lambda_u$ and $\lambda_d$ back to the optical switch 402, and then the optical switch 402 guides the optical signals $\lambda_u$ and $\lambda_d$ back to the fourth optical fiber 34d corresponding to the ONU 40c. Through the configuration of the optical switch 402 and the first reflecting mirror 401, if the user end 12c corresponding to the ONU 40c is powered off, the upstream and downstream optical signals still can be transmitted back to the ODN 30, such that the communication of the entire system is not affected. Although the ONU 40c has the optical switch 402 and the first reflecting mirror 401, the design spirit may still be achieved without the two elements.

Then, as for the processing of the downstream optical signal $\lambda_d$, the ONU 40c further comprises a first optical coupler 403a, a fiber grating filter 404, and a downstream receiver 405. The first optical coupler 403a receives the downstream optical signal $\lambda_d$ and splits the downstream optical signal $\lambda_d$ into the fiber grating filter 404 and the downstream receiver 405. The fiber grating filter 404 reflects the downstream optical signal $\lambda_d$ from the first optical coupler back to the first optical coupler 403a. In this manner, the downstream optical signal is then guided back to the ODN 30 (the fourth optical fiber 34d). The downstream receiver 405 performs a decoding process on the downstream optical signal $\lambda_d$. In the above decoding process, after the downstream optical signal $\lambda_d$ is decoded, the downstream receiver 405 further determines whether the decoded data belongs to the data of the ONU 40c or not. The downstream receiver 405 drops the data that does not belong to the data of the ONU 40c, and transmits the data that belongs to the data of the ONU 40c down to 42m.

The fiber grating filter 404 is an optical fiber having a Bragg reflector, which reflects light rays in a specific wavelength, and enables the remaining light rays to pass there through. For example, the fiber grating filter 404 of the ONU 40c mainly reflects the light rays in the wavelength of the downstream optical signal $\lambda_d$, and enables the light rays in the wavelengths other than the wavelength of the downstream optical signal $\lambda_d$ to pass there through, that is, to drop the light rays after the guiding process.

Then, as for the processing of the upstream optical signal $\lambda_u$, the ONU 40c comprises an upstream receiver 407 and an upstream transmitter 406. The upstream receiver 407 and the upstream transmitter 406 constitute an upstream processing unit 46. The upstream receiver 407 receives and converts the upstream optical signal $\lambda_u$ into a received electrical signal 408. The upstream transmitter 406 combines the electrical signal to be uploaded 44c with the received electrical signal 408 to generate the upstream optical signal $\lambda_u$, and then transmits the upstream optical signal $\lambda_u$ back to the corresponding fourth optical fiber 34d. The user end 12c where the ONU 40c is configured has the remote antenna 18b, such that the upstream transmitter 406 of the ONU 40c combines the data received by the remote antenna 18b with the electrical signal to be uploaded 44c and the received electrical signal 408 to generate the upstream optical signal $\lambda_u$, and then transmits the upstream optical signal $\lambda_u$ back to the corresponding fourth optical fiber 34d.

The ONU 40c further comprises a second optical coupler 403b. The second optical coupler 403b has two splitting ends 410 and 411 and one combining end 412. The combining end 412 receives the upstream optical signal $\lambda_u$ from a corresponding optical fiber. The two splitting ends 410 and 411 are respectively connected to the upstream receiver 407 and the upstream transmitter 406. The optical couplers 403a and 403b are used to split the light ray from the combining end 412 into two portions, and transmit the two portions of light rays from the splitting ends 410 and 411 respectively. In addition, when the light rays are transferred from the splitting ends 410 and 411, the light rays are guided to the combining end 412 and are transmitted outwards.

Although the ONU 40c is taken as an example in FIG. 4A, each ONU 40a, 40b, 40c, or 40m may adopt such architecture. That is to say, the ONU 40c is an ONU having complete functions of processing the downstream optical signal $\lambda_d$, processing the upstream optical signal $\lambda_u$, combining the electrical signal to be uploaded 44c, and processing and combing the data received by the remote antenna 18b. As for the ONU 40a corresponding to the second optical fiber 34b, the received optical signal only comprises the downstream optical signal $\lambda_d$, but does not comprise the upstream optical signal $\lambda_u$, so that the upstream receiver 407 thereof does not receive the upstream optical signal $\lambda_u$, and does not generate the received electrical signal 408 either.

Next, the ONU 40b corresponding to the third optical fiber 34c is taken as an example, in which the corresponding user end does not have the remote antenna 18a or 18b, so that the upstream transmitter 406 thereof does not need to combine the data received by the remote antenna 18a or 18b.

Then, the last ONU 40m is taken as an example, in which the corresponding user end does not have the remote antenna 18a or 18b, and does not have a next ONU 40a, 40b, 40c, or 40m either, so that the ONU 40m does not need to combine the data received by the remote antenna 18a or 18b, and does not need to transmit back the downstream optical signal $\lambda_d$ either.

Although all the ONUs 40a, 40b, 40c, and 40m configured on different user ends 12a, 12b, 12c, and 12m may adopt the architecture of the ONU 40c as shown in FIG. 4A, different architectures of the ONUs 40a, 40b, 40c, and 40m are further provided depending upon the demands of the different user ends 12a, 12b, 12c, and 12m.

Figure 4B:
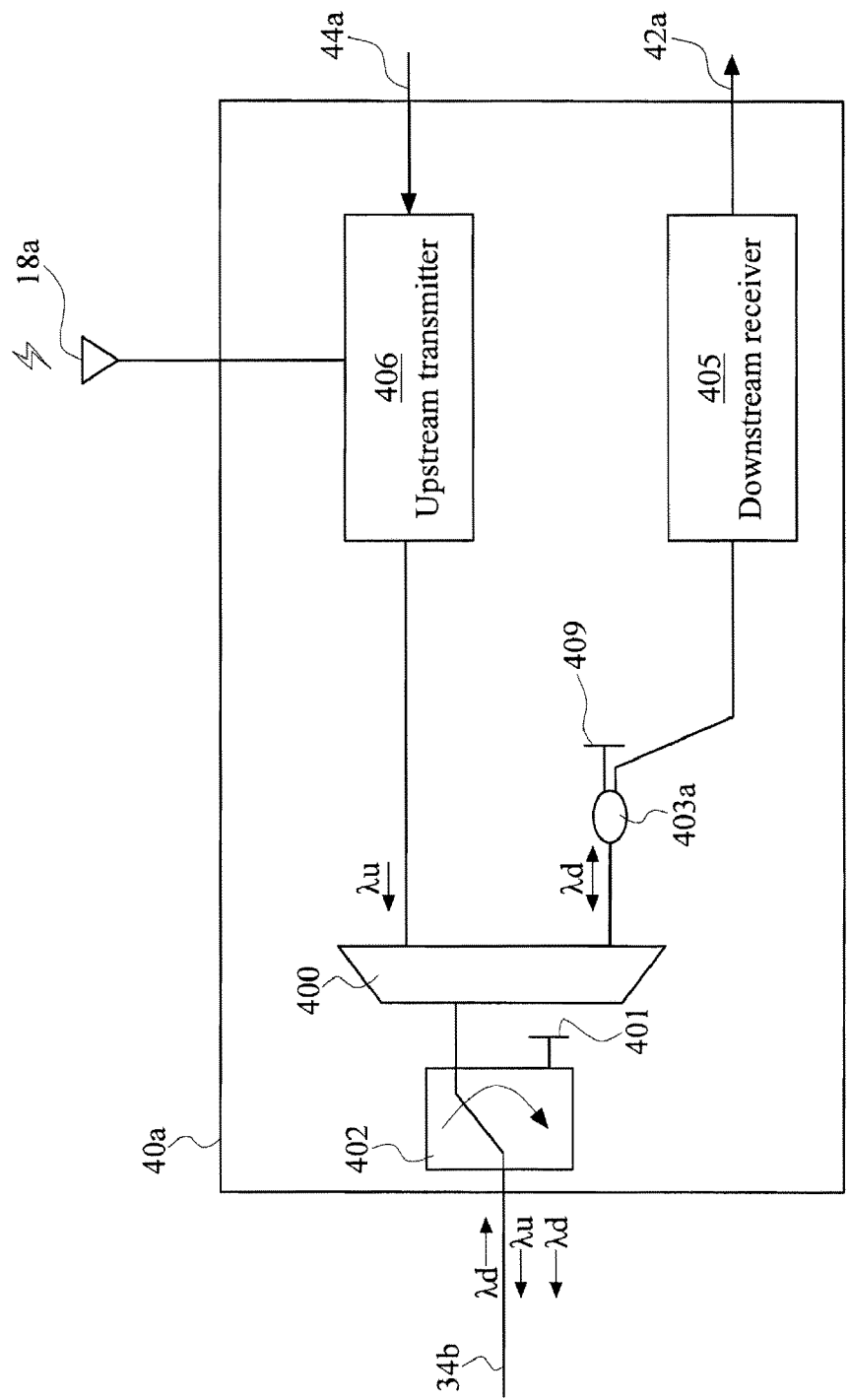
FIG. 4B is a schematic architectural view of another embodiment of an ONU.

FIG. 4B is a schematic architectural view of another embodiment of an ONU. Referring to FIG. 4B, the ONU 40a may be applied to the user end 12a corresponding to the second optical fiber. The user end 12a has the remote antenna 18a, but does not receive the upstream optical signal $\lambda_u$, so that the upstream receiver 407 is omitted in the ONU 40a. The upstream transmitter 406 in the ONU 40a converts the electrical signal to be uploaded 44a to generate the upstream optical signal $\lambda_u$, and then transmits the upstream optical signal $\lambda_u$ back to the second optical fiber 34b. In addition, the ONU 40a has a second reflecting mirror 409, instead of the fiber grating filter 404. The second reflecting mirror 409 reflects the downstream optical signal $\lambda_d$ from the first optical coupler 403a back to the first optical coupler 403a. The downstream receiver 405 performs the decoding process on the downstream optical signal $\lambda_d$ as described above.

The second reflecting mirror 409 is used to replace the fiber grating filter 404, and the difference there-between is that the second reflecting mirror 409 reflects the light rays in all the wavelengths, but the fiber grating filter 404 reflects the light rays in a specific wavelength. The fiber grating filter 404 is preferred.

Figure 4C:
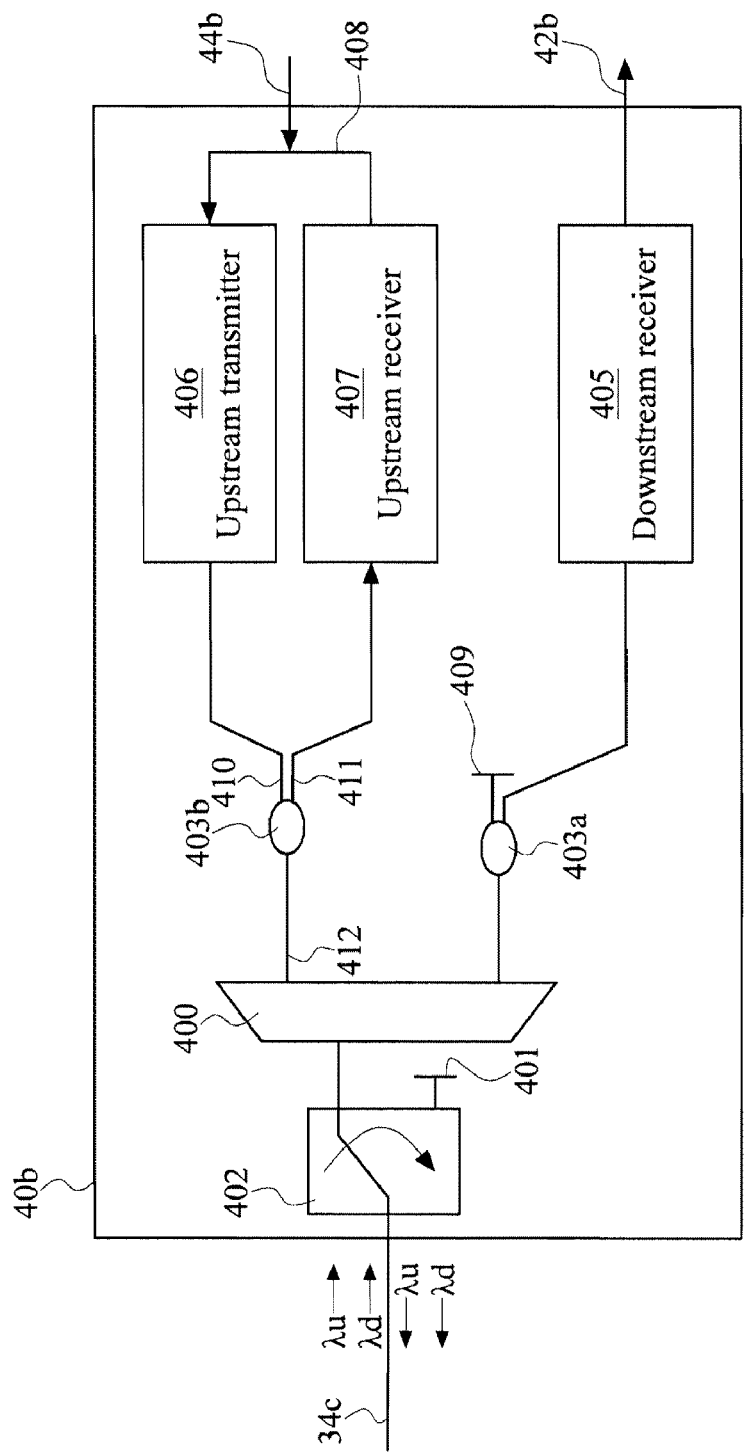
FIG. 4C is a schematic architectural view of another embodiment of an ONU.

Next, FIG. 4C is a schematic architectural view of another embodiment of an ONU. Referring to FIG. 4C, the architecture of the ONU 40b is similar to the architecture of another ONU 40c, except that the upstream transmitter 406 of the ONU 40b does not need to combine the data received by the remote antenna 18a or 18b with the upstream optical signal $\lambda_u$.

Figure 4D:
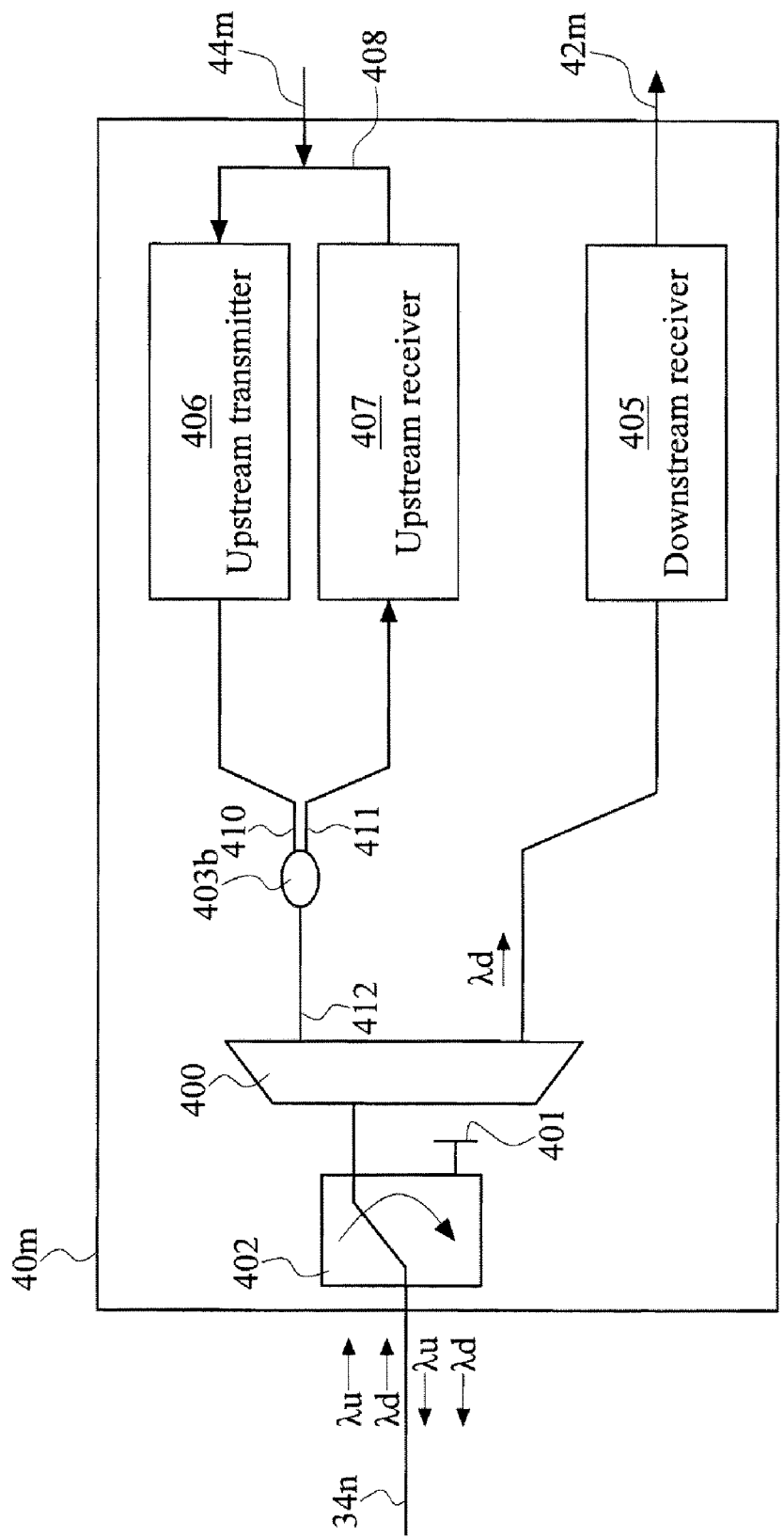
FIG. 4D is a schematic architectural view of another embodiment of an ONU.

FIG. 4D is a schematic architectural view of another embodiment of an ONU. Referring to FIG. 4D, the ONU 40m is applicable to the user end 12m corresponding to the last optical fiber ($n^{th}$ optical fiber) 34n. As described above, the ONU 40m does not need to transmit back the downstream optical signal $\lambda_d$, so that the ONU 40m does not have the first optical coupler 403a and the fiber grating filter 404. The remaining parts are the same as that of the ONU 40c, which thus are not described repeatedly here.

Figure 5A:
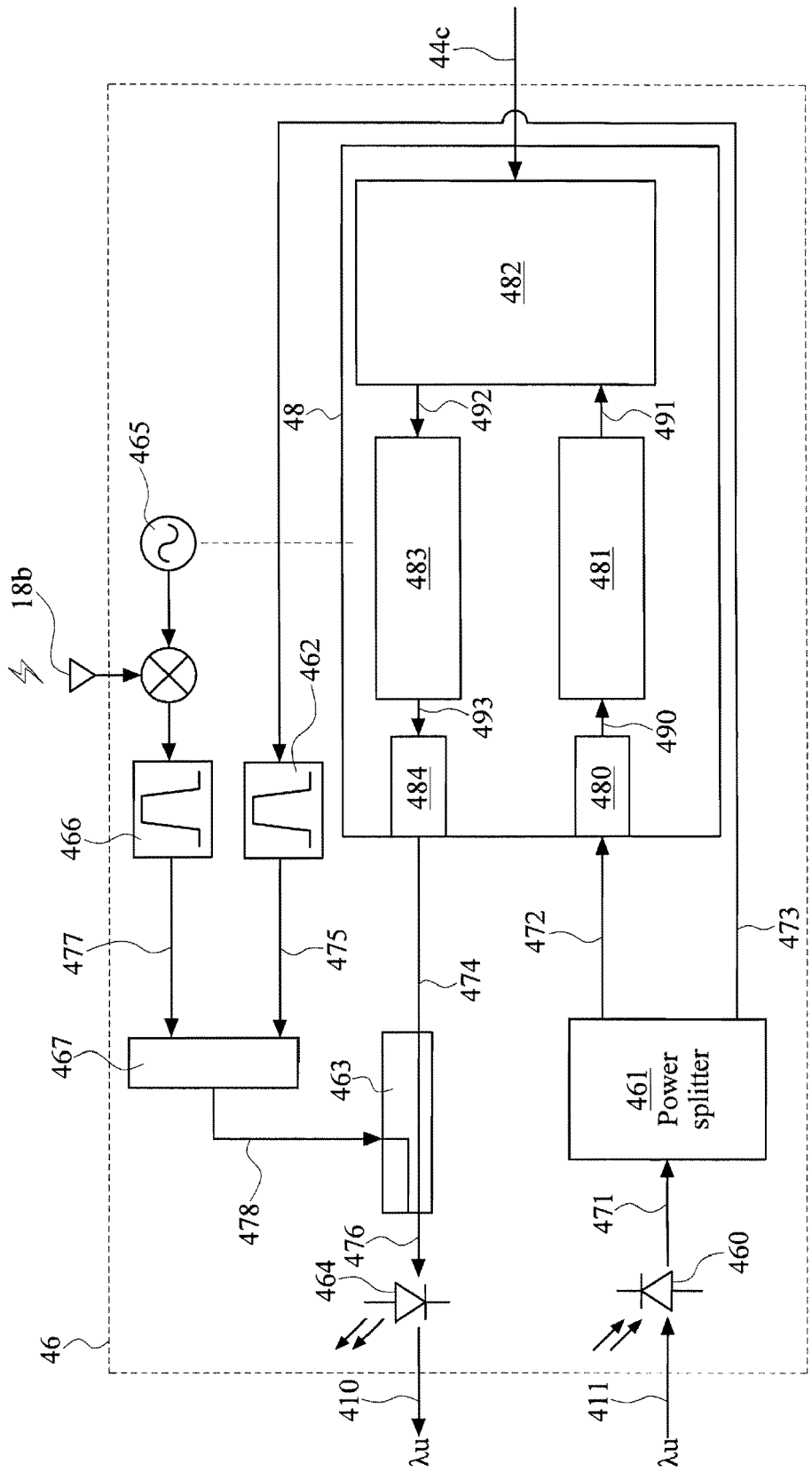
FIG. 5A is a schematic architectural view of an embodiment of an upstream processing unit.

Furthermore, FIG. 5A is a schematic architectural view of an embodiment of an upstream processing unit. Referring to FIG. 5A, the upstream processing unit 46 comprises a photoelectric converting element 460 (so-called photo receiver), a power splitter 461, a digital processing controller 48, a first band pass filter 462, an electrical coupler 463, a frequency shifter 465, a second band pass filter 466, a combiner 467, and an electro-optical converting element 464 (so-called DML, directly-modulated laser).

Figure 6A:
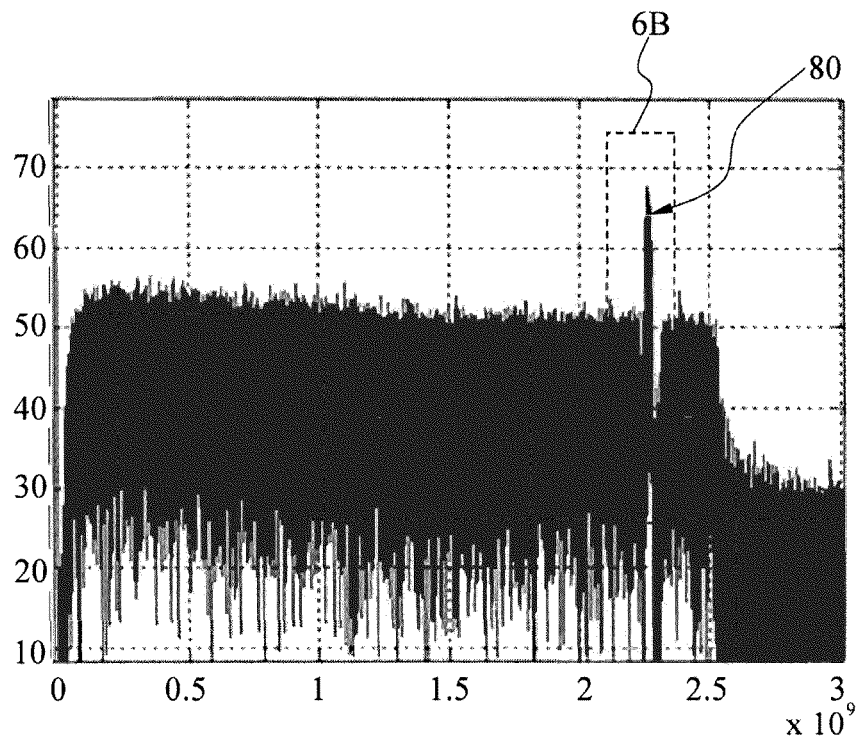
FIG. 6A is a schematic view of a frequency spectrum at a specific time point after a first electrical signal is converted to a frequency domain according to an embodiment.

The photoelectric converting element 460 is used to convert the upstream optical signal $\lambda_u$ from the corresponding optical fiber into a first electrical signal 471. FIG. 6A is a schematic view of a frequency spectrum at a specific time point after the first electrical signal 471 is converted to a frequency domain. Referring to FIG. 6A, the schematic view of the frequency spectrum of the first electrical signal 471 is obtained through testing by taking the OFDMA-GPON as an example, in which a transverse axis is a frequency with a unit of Gbps ($10^9$ bits per second), and a longitudinal axis is a signal intensity with a unit of power (dBm). As seen from the drawing that, a total frequency band (total bandwidth) of the first electrical signal 471 may be, but not limited to, from 0.1 Gbps to 2.5 Gbps. In the first electrical signal 471, one predetermined frequency band is reserved for transmitting wireless signals, that is, the frequency band in an interval from 2.25 Gbps to 2.3 Gbps. The predetermined frequency band (also called wireless frequency band herein) may be adjusted according to the demands of the user. The frequency bands (that is, from 0.1 Gbps to 2.25 Gbps, and from 2.3 Gbps to 2.5 Gbps) other than the predetermined frequency band may be used to transfer digital data or control data (briefly referred to as data frequency bands below). As known from the drawing that, wireless data 80 having a higher intensity and being close to the position of 2.25 Gbps exists in the interval of the predetermined frequency band, so that the wireless data is combined with the data frequency band. The data in the data frequency band is transmitted in an OFDM manner.

Figure 6B:
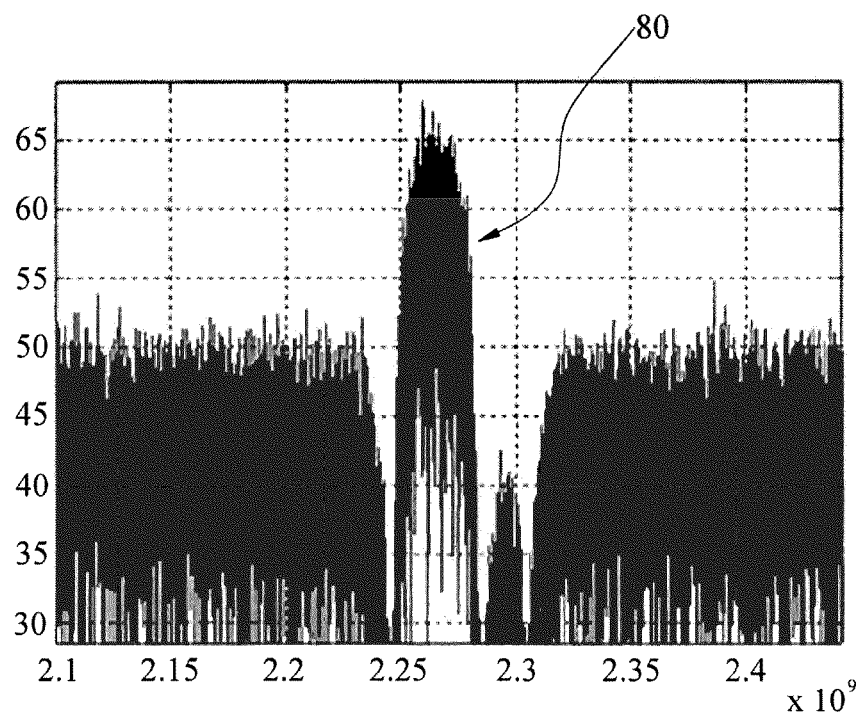
FIG. 6B is an enlarged view of FIG. 6A taken at a position of 6B.

FIG. 6B is an enlarged view of FIG. 6A taken at a position of 6B. As clearly seen from FIG. 6B, no interferences are generated between the predetermined frequency band for transmitting wireless data and the data frequency band for transmitting digital data and control data.

The power splitter 461 splits the first electrical signal into a second electrical signal 472 and a third electrical signal 473 (also called split electrical signals). The waveforms of the second electrical signal 472 and the third electrical signal 473 are the same as that of the first electrical signal 471, but the intensities thereof are much weaker. The intensities of both the second electrical signal 472 and the third electrical signal 473 approximately approach one half of the intensity of the first electrical signal 471. Definitely, an intensity ratio of the second electrical signal 472 to the third electrical signal 473 may be set to a specific value, for example, 1:1, 3:2, and the like.

Figure 6C:
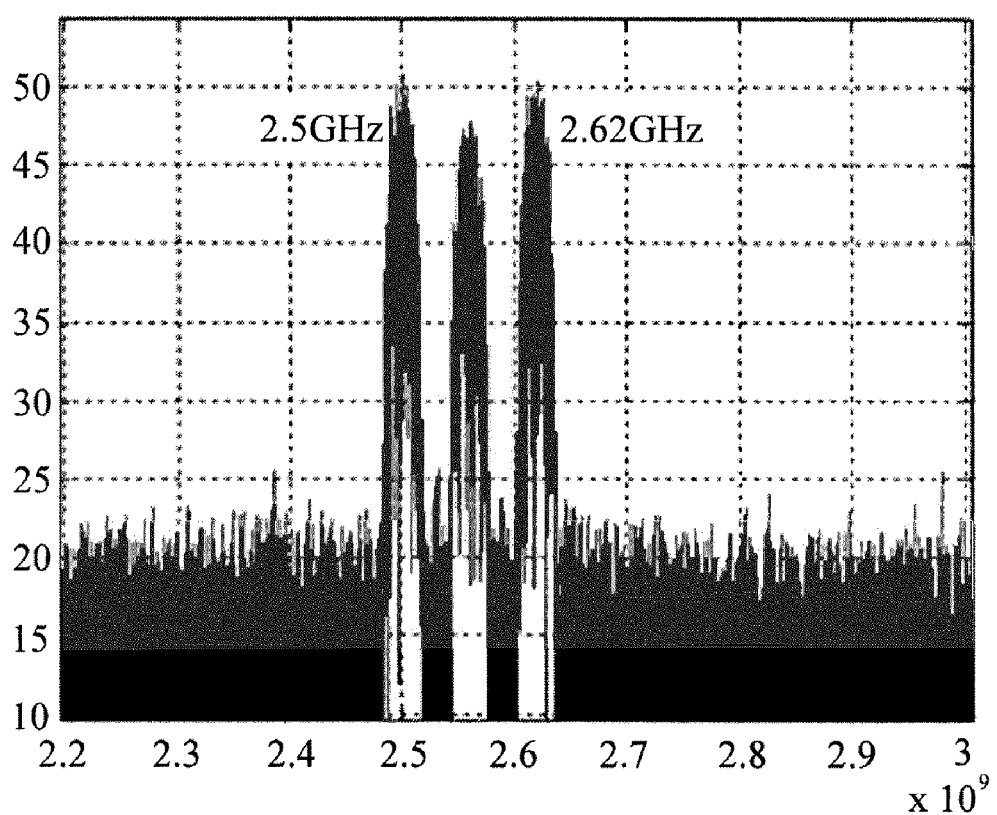
FIG. 6C is a view of a frequency spectrum at a specific time point after a fifth electrical signal is converted to a frequency domain.

The first band pass filter 462 filters the third electrical signal 473 to enable the third electrical signal 473 within the predetermined frequency band range to pass through, so as to form a fifth electrical signal 475. FIG. 6C is a view of a frequency spectrum at a specific time point after the fifth electrical signal 475 is converted to a frequency domain. Referring to FIG. 6C, as known from FIG. 6C, the signals within the data frequency band interval are all filtered, but the signals within the predetermined frequency band are reserved. In this example, three wireless data within the predetermined frequency band is anticipated to be uploaded (an example different from that of FIG. 6A). Through the function of the first band pass filter 462, the intensity of the wireless data is much higher than that of the data frequency band, thereby reducing noises generated during the subsequent coupling process (described in detail hereafter).

The frequency shifter 465 performs a frequency shift on the data received by the remote antenna 18b. Through the frequency shift process, the frequency of the data received by the remote antenna 18b is shifted to the predetermined frequency band range, and does not overlap with the position of the frequency of the wireless data in the received third electrical signal 473, thereby avoiding the interferences. The frequency shifter 465 may be predetermined in advance or adjusted manually. That is to say, when the entire PON system is installed, the shifted frequency of each remote antenna 18a or 18b is set, thereby preventing the overlapping problem. In addition, the position of the frequency of the wireless data in the third electrical signal 473 is detected in real time, and then the frequency to be shifted by the frequency shifter is automatically set. The above manner is fairly intelligent, and correspondingly the cost is rather high.

The second band pass filter 466 filters the frequency-shifted data to enable the frequency-shifted data within the predetermined frequency band range to pass through, so as to form a seventh electrical signal 477. The seventh electrical signal 477 only has one wireless data within the predetermined frequency band range.

Next, the combiner 467 combines the fifth electrical signal 475 with the seventh electrical signal 477 to form an eighth electrical signal 478. That is to say, the wireless data of the ONU 40c is combined with the wireless data in the upstream optical signal $\lambda_u$ from the previous ONU 40b, and no interference is generated there-between.

Furthermore, the reservation and addition of the data in the data frequency band is realized by the digital processing controller 48. The digital processing controller 48 receives the second electrical signal 472 and combines the second electrical signal 472 with the electrical signal to be uploaded 44c to output a fourth electrical signal 474 (also called a combined electrical signal). The electrical signal to be uploaded 44c is received by the digital processing controller 48 and is registered in a buffer. The digital processing controller 48 converts the second electrical signal 472 into an analog signal, and demodulates the analog signal in an OFDM manner. Next, the digital processing controller 48 combines the electrical signal to be uploaded 44c in the buffer with the demodulated second electrical signal 472. Then, the digital processing controller 48 modulates the combined signal in the OFDM manner and coverts the modulated signal into an analog signal to output the analog signal as the fourth electrical signal 474. The detailed structure and the efficacies of the digital processing controller 48 are described in detail below.

The electrical coupler 463 couples the eighth electrical signal 478 with the fourth electrical signal 474 to form a sixth electrical signal 476. The digital processing controller 48 is used to process the data in the data frequency band, but the eighth electrical signal 478 is the data in the predetermined frequency band (wireless frequency band) only. Thus, after the electrical coupler 463 combines the eighth electrical signal 478 with the fourth electrical signal 474, the data received by the remote antenna 18b and the data to the uploaded 44c are completely added (combined) with the received upstream optical signal (the sixth signal 476 is still an electrical signal).

The electro-optical converting element 464 converts the sixth electrical signal 476 into the upstream optical signal $\lambda_u$.

The electrical coupler 463 is a directional coupler, which is used to directionally couple the eighth electrical signal 478 with the fourth electrical signal 474 to form the sixth electrical signal 476. The electro-optical converting element 464 may select a laser capable of generating the wavelength of the upstream optical signal $\lambda_u$. The bandwidth of the laser needs to satisfy the specification of the PON system. The electro-optical converting element 464 may be a photo sensor.

In addition, the digital processing controller 48 comprises an analog to digital converter 480, an OFDM demodulator 481, a data access controller 482, an OFDM modulator 483, and a digital to analog converter 484.

The analog to digital converter 480 converts the second electrical signal 472 into a digital signal 490, that is, the analog to digital converter 480 converts the received upstream optical signal $\lambda_u$ into an upstream electrical signal. Next, the OFDM demodulator 481 demodulates the digital signal 490 into a demodulated signal 491. The data access controller 482 combines the demodulated signal 491 with the electrical signal to be uploaded 44c to form a combined signal 492. The OFDM modulator 483 performs an orthogonal modulation on the combined signal 492 to form a modulated signal 493. The digital to analog converter 484 converts the modulated signal 493 into an analog signal to output the analog signal as the fourth electrical signal 474.

Figure 5B:
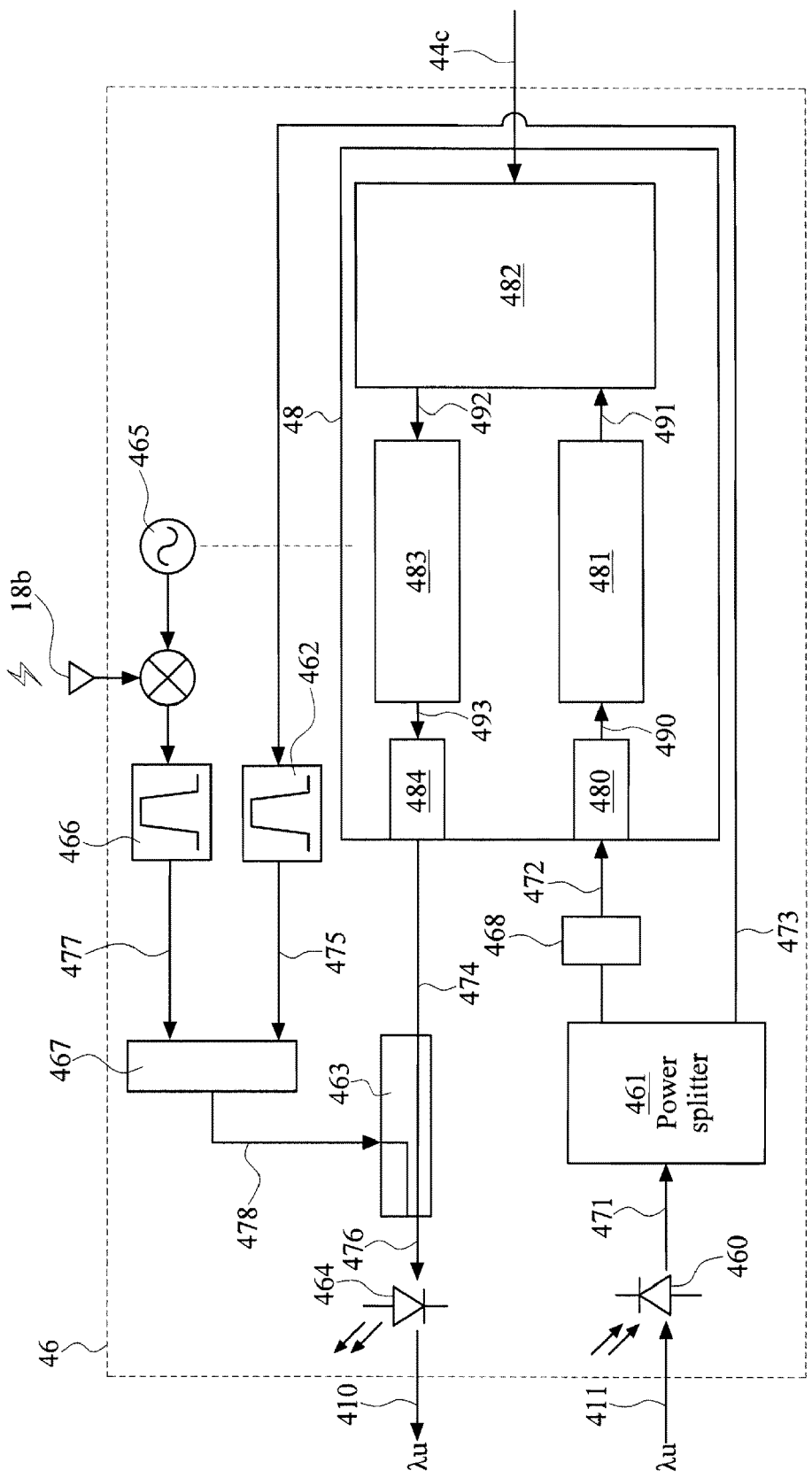
FIG. 5B is a schematic architectural view of another embodiment of an upstream processing unit.

As known from the above, besides the data of the data frequency band, the second electrical signal 472 further comprises the data of the wireless frequency band. The digital processing controller 48 only processes and adds the data of the data frequency band, and when the electrical coupler 463 performs the coupling, the signal of the wireless frequency band may be overlapped with the wireless data of the eighth electrical signal. Thus, the signal of the wireless frequency band may be considered to be filtered before the digital processing controller 48 receives the second electrical signal 472. FIG. 5B is a schematic architectural view of another embodiment of the upstream processing unit 46. As seen from FIG. 5B, before the digital processing controller 48, a band stop filter (or notch filter) 468 is configured. The band stop filter 468 is used to perform a band stop on the second electrical signal 472 within the predetermined frequency band (wireless frequency band), and then transfer the second electrical signal 472 to the digital processing controller 48. In other words, the band stop filter 468 only enables the second electrical signal 472 within the data frequency band interval to pass through.

The embodiment of FIGS. 5A and 5B of the upstream processing unit 46 may be applicable to the ONUs 40a, 40b, 40c, and 40m located on the different user ends 12a, 12b, 12c, and 12m. Although a part of the ONUs, that is, 40b and 40m, do not have the remote antenna 18a or 18b, the upstream processing unit 46 still can be used, and in this case, the difference is that the frequency shifter 465 and the second band pass filter 466 do not function.

Figure 5C:
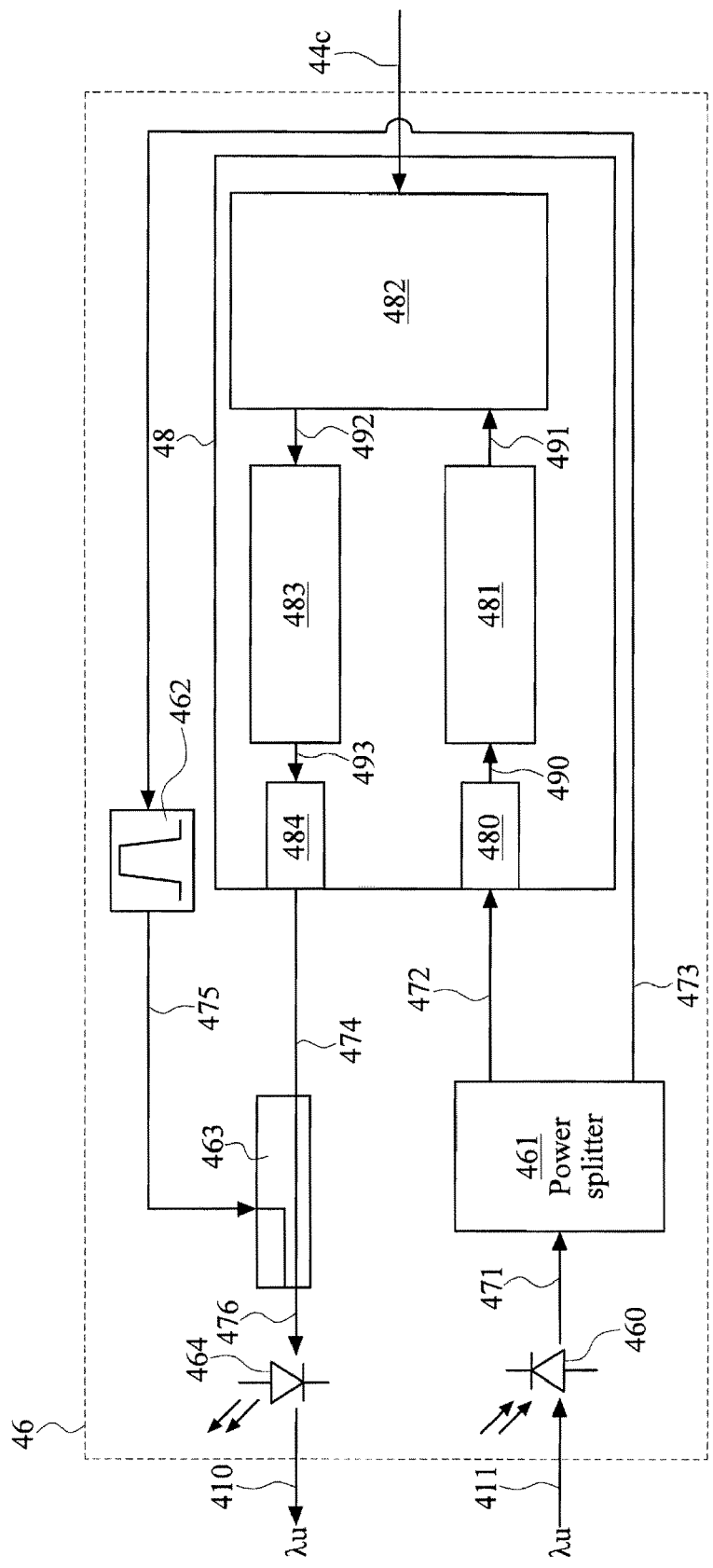
FIG. 5C is a schematic architectural view of another embodiment of an upstream processing unit.

In order to be applicable to the user end 12b without the remote antenna 18a or 18b, another embodiment of the upstream processing unit 46 is provided. As seen from FIG. 5C, the first band pass filter 462 filters the third electrical signal 473 to enable the third electrical signal 473 within the predetermined frequency band range to pass through, so as to form the fifth electrical signal 475. The electrical coupler 463 couples the fourth electrical signal 474 with the fifth electrical signal 475 to form the sixth electrical signal 476. In this manner, the efficacies and the objectives of the upstream processing unit 46 are achieved.

Figure 5D:
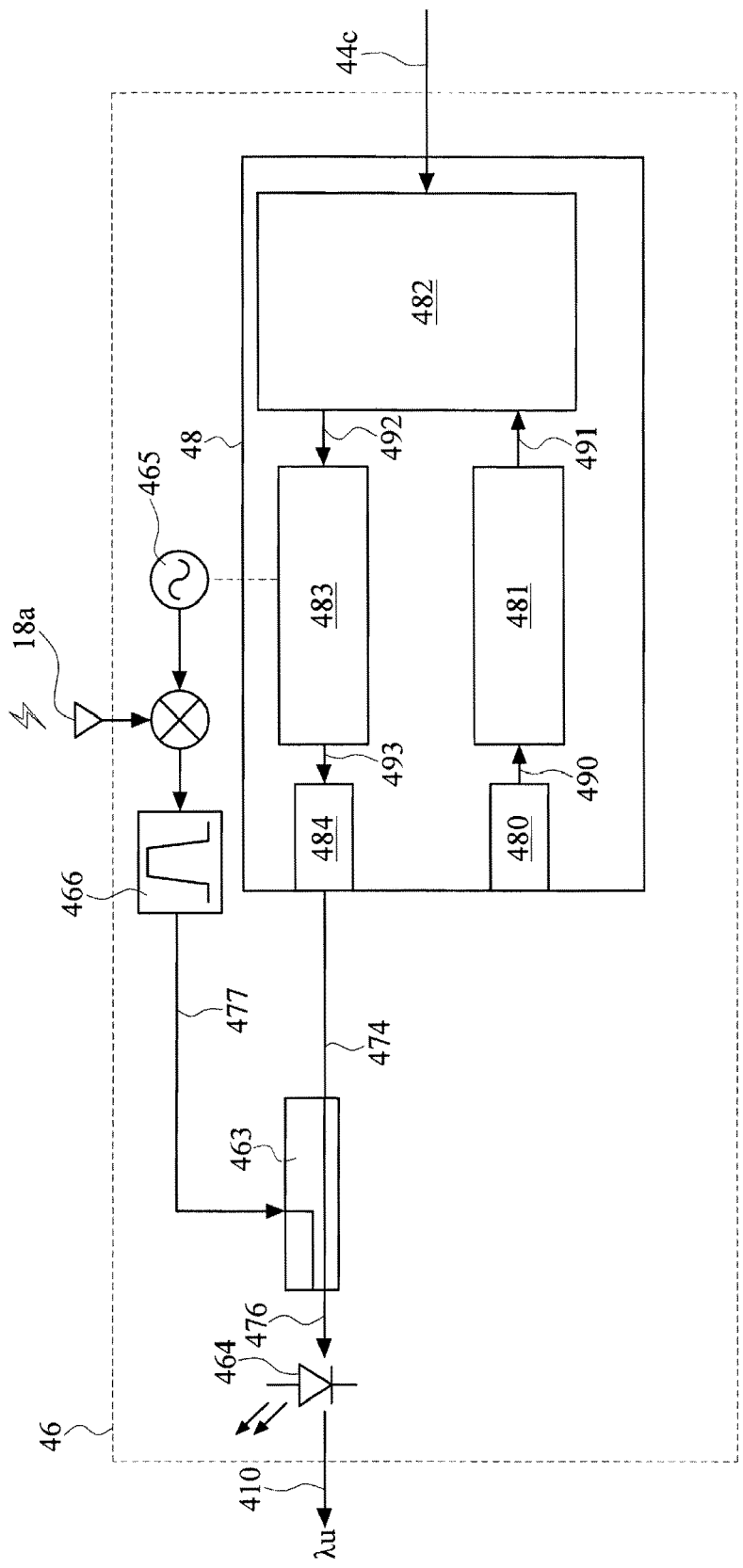
FIG. 5D is a schematic architectural view of another embodiment of an upstream processing unit.

Next, FIG. 5D is a schematic architectural view of another embodiment of an upstream processing unit. Referring to FIG. 5D, the upstream processing unit 46 may be applied to the ONU 40a connected to the second optical fiber 34b. The optical signal received by the ONU 40a from the second optical fiber 34b does not comprise the upstream optical signal $\lambda_u$, such that certain elements in the embodiment of FIGS. 5A and 5B may be omitted. As seen from FIG. 5D, the upstream processing unit 46 comprises a digital processing controller 48, a second band pass filter 466, a frequency shifter 465, an electrical coupler 463, and an electro-optical converting element 464. Connection relationships among the elements and motions thereof are not described.

The other embodiment of the upstream processing unit shown in FIG. 5D is applied to the ONU 40a connected to the second optical fiber 34b, and the ONU 40a is just configured with the remote antenna 18a, such that the embodiment of FIG. 5D is adopted. If the ONU 40a connected to the second optical fiber 34b is not configured with the remote antenna 18a, the second band pass filter 466, the frequency shifter 465, and the electrical coupler 463 in FIG. 5D can be removed.

Although the embodiment of FIG. 5D has the most simplified structure, the ONU 40a connected to the second optical fiber 34b may also be realized by the embodiment of FIG. 5A or 5B of the ONU having full functions.

As known from the above, the optical circulator assembly 32 does not adopt the optical splitter, such that the luminous element (laser) of the OLT may select a luminous element (laser) with a moderate luminous intensity, thereby lowering the specification of selected parts.

Figure 7:
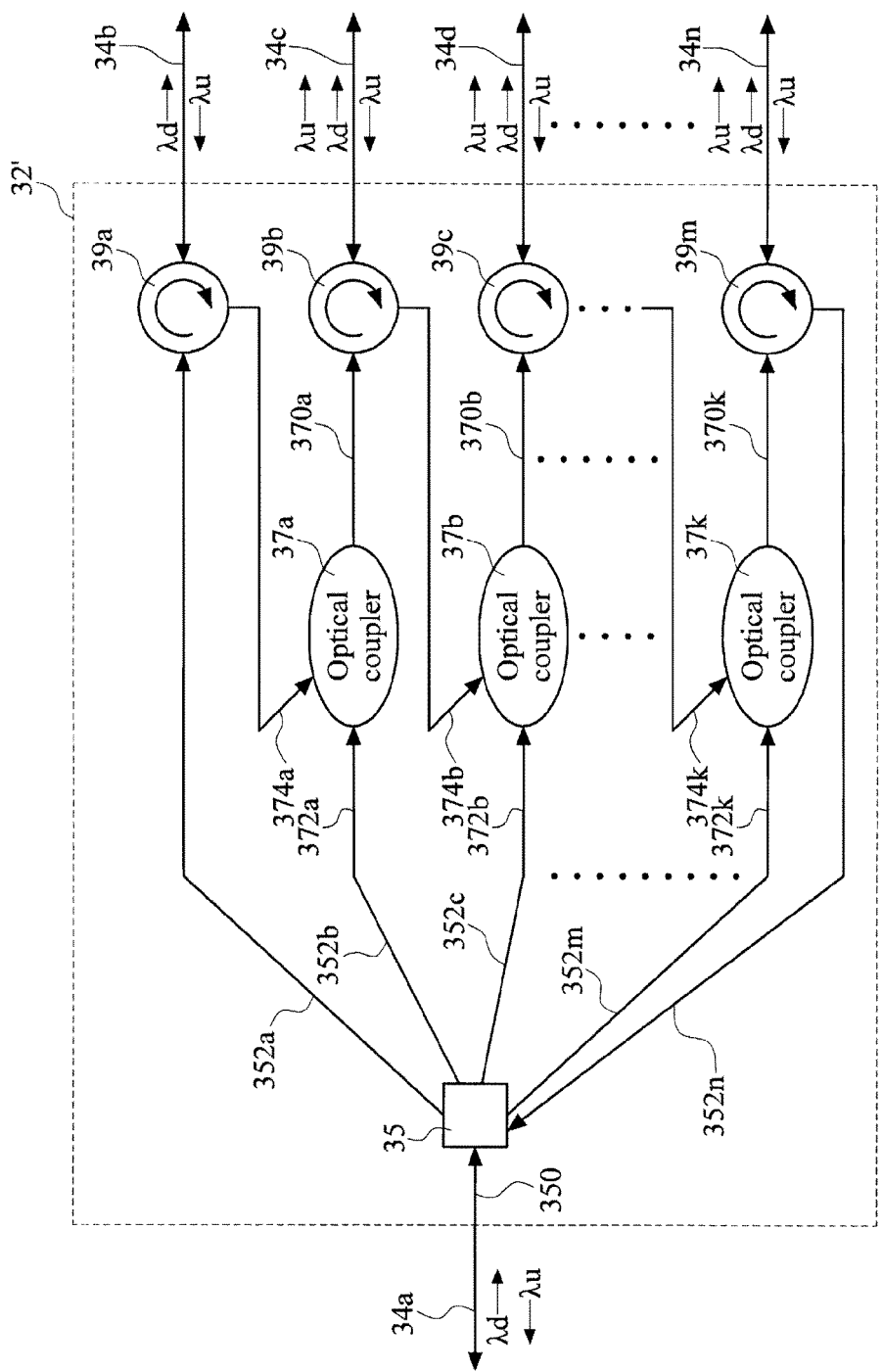
FIG. 7 is a schematic architectural view of another embodiment of an optical circulator assembly.

Finally, FIG. 7 is a schematic architectural view of another embodiment of an optical circulator assembly. Referring to FIG. 7, the optical circulator assembly 32' comprises an optical splitter 35, first, second, . . . $m^{th}$ circulators 39a, 39b, 39c, and 39m (that is, m circulators), and first, second, . . . $k^{th}$ optical couplers 37a, 37b, and 37k (that is, k optical couplers), in which m is a positive integer greater than 1, and m=n−1, and k is a positive integer greater than 0, and k=n−2.

The optical splitter 35 has a joining end 350 and first, second, . . . $n^{th}$ branch ends 352a, 352b, 352c, 352m, and 352n (that is, n branch ends), and the joining end 350 is connected to the first optical fiber 34a, in which n is a positive integer greater than 2. The optical splitter 35 splits and then guides the downstream optical signal $\lambda_d$ from the first optical fiber 34a to the second, . . . $n^{th}$ branch ends 352b, 352c, and 352n, and combines and then guides the upstream optical signal from the second, . . . $n^{th}$ branch ends 352b, 352c, and 352n to the joining end 350.

Each of the first, second, . . . $k^{th}$ optical couplers 37a, 37b, and 37k has a combining end 370a, 370b, or 370k, a first splitting end 372a, 372b, or 372k, and a second splitting end 374a, 374b, or 374k. The second, . . . $m^{th}$ splitting end 352b, 352c, or 352m is respectively connected to the first splitting end 372a, 372b, or 372k of the first, second, . . . $k^{th}$ optical coupler 37a, 37b, or 37k. Each optical coupler 37a, 37b, or 37k couples and then guides the optical signal $\lambda_d$ or $\lambda_u$ from the first or second splitting end 370a, 370b, 370k, 372a, 372b, or 372k to the combining end 370a, 370b, or 370k.

The first, second, . . . $m^{th}$ circulator 39a, 39b, 39c, or 39m is respectively connected to the second, third, . . . $n^{th}$ optical fiber 34b, 34c, 34d, or 34n. The first circulator 39a is connected to the first branch end 352a. The first, second, . . . $(m-1)^{th}$ circulator 39a, 39b, or 39c is connected to the second splitting end 374a, 374b, or 374k of the first, second, . . . $k^{th}$ optical coupler 37a, 37b, or 37k. The combining end 370a, 370b, or 370k of the first, second, . . . $k^{th}$ optical coupler 37a, 37b, or 37k is connected to the second, . . . $m^{th}$ circulator 39b, 39c, or 39m. The $m^{th}$ circulator 39m is further opto-connected to the $n^{th}$ branch end 352n.

The first circulator 39a guides the downstream optical signal $\lambda_d$ from the first branch end 352a to the second optical fiber 34b, and guides the upstream optical signal $\lambda_u$ from the second optical fiber 34b to the second splitting end 374a connected to the first circulator 39a. The second, . . . $(n-2)^{th}$ (that is, $(m-1)^{th}$) circulator 39b or 39c respectively guides the optical signals $\lambda_d$ and $\lambda_u$ from the combining end 370a or 370b connected to the circulator 39b or 39c to the third, . . . $(n-1)^{th}$ optical fiber 34c or 34e, and guides the upstream optical signal $\lambda_u$ from the third, . . . $(n-1)^{th}$ optical fiber 34c or 34e to the second splitting end 374b or 374c connected to the circulator 39b or 39c. The $(n-1)^{th}$ (that is, $m^{th}$) circulator 39m guides the optical signals $\lambda_d$ and $\lambda_u$ from the combining end 370c connected to the circulator 39m to the $n^{th}$ optical fiber 34n, and guides the upstream optical signal $\lambda_u$ from the $n^{th}$ optical fiber 34n to the $n^{th}$ branch end 352n.

Due to the opto-connection relationship, the downstream optical signal $\lambda_d$ from the first optical fiber is split into n downstream optical signals $\lambda_d$ by the optical splitter 35, and then the n downstream optical signals $\lambda_d$ are respectively transmitted outwards from the first, second, . . . $n^{th}$ branch ends 352a, 352b, 352c, 352m, and 352n. The light intensity of the downstream optical signals $\lambda_d$ transmitted from the first, second, . . . $n^{th}$ branch ends 352a, 352b, 352c, 352m, and 352n is much lower than that of the downstream optical signal $\lambda_d$ received from the joining end 350.

The downstream optical signal $\lambda_d$ transmitted from the first branch end 352a is transmitted to the second optical fiber through the first circulator 39a. The upstream optical signal $\lambda_u$ transmitted back from the second optical fiber is transmitted to the first circulator 39a and then guided to the first optical coupler 37a. At this time, the first optical coupler 37a couples the downstream optical signal $\lambda_d$ from the second splitting end 374a with the upstream optical signal $\lambda_u$ from the first splitting end 372a, and then the combining end 370a transmits the coupled signal to the second circulator 39b. Next, the second circulator transmits the signals $\lambda_u$ and $\lambda_d$ from the combining end 370a to the third optical fiber 34c. The signal $\lambda_u$ transmitted back from the third optical fiber 34c is transmitted to the $k^{th}$ optical coupler 37k, the $m^{th}$ circulator 39m, and the $n^{th}$ optical fiber 34n in sequence according to the above-described manner.

When the $n^{th}$ optical fiber transmits back the upstream optical signal $\lambda_u$, the $m^{th}$ circulator 39m guides the upstream optical signal $\lambda_u$ to the $n^{th}$ branch end 352n. At this time, the optical splitter 35 transmits the upstream optical signal $\lambda_u$ back to the first optical fiber 34a.

In addition, although the downstream optical signal $\lambda_d$ split by the optical splitter 35 to the $n^{th}$ branch end 352n is guided to the $m^{th}$ circulator 39m, the $m^{th}$ circulator 39m may not transmit the signal from the $n^{th}$ branch end 352n to the combining end 370k of the $k^{th}$ optical coupler 37k, such that the downstream optical signal $\lambda_d$ and the upstream optical signal $\lambda_u$ are not mixed.

In FIG. 7, the optical splitter 35 directly splits the downstream optical signal $\lambda_d$ from the central office 10 and then directly transmits the downstream optical signal $\lambda_d$ to the second, . . . $n^{th}$ optical fibers 34b, 34c, 34d, and 34n through the optical couplers 37a, 37b, and 37k and the circulators 39a, 39b, 39c, and 39m. Therefore, the first, second, . . . $m^{th}$ ONU 40a, 40b, 40c, or 40m configured with the optical circulator assembly 32' of FIG. 7 does not need to transmit back the downstream optical signal $\lambda_d$, which is the same as the $m^{th}$ ONU 40m.

Figure 8:
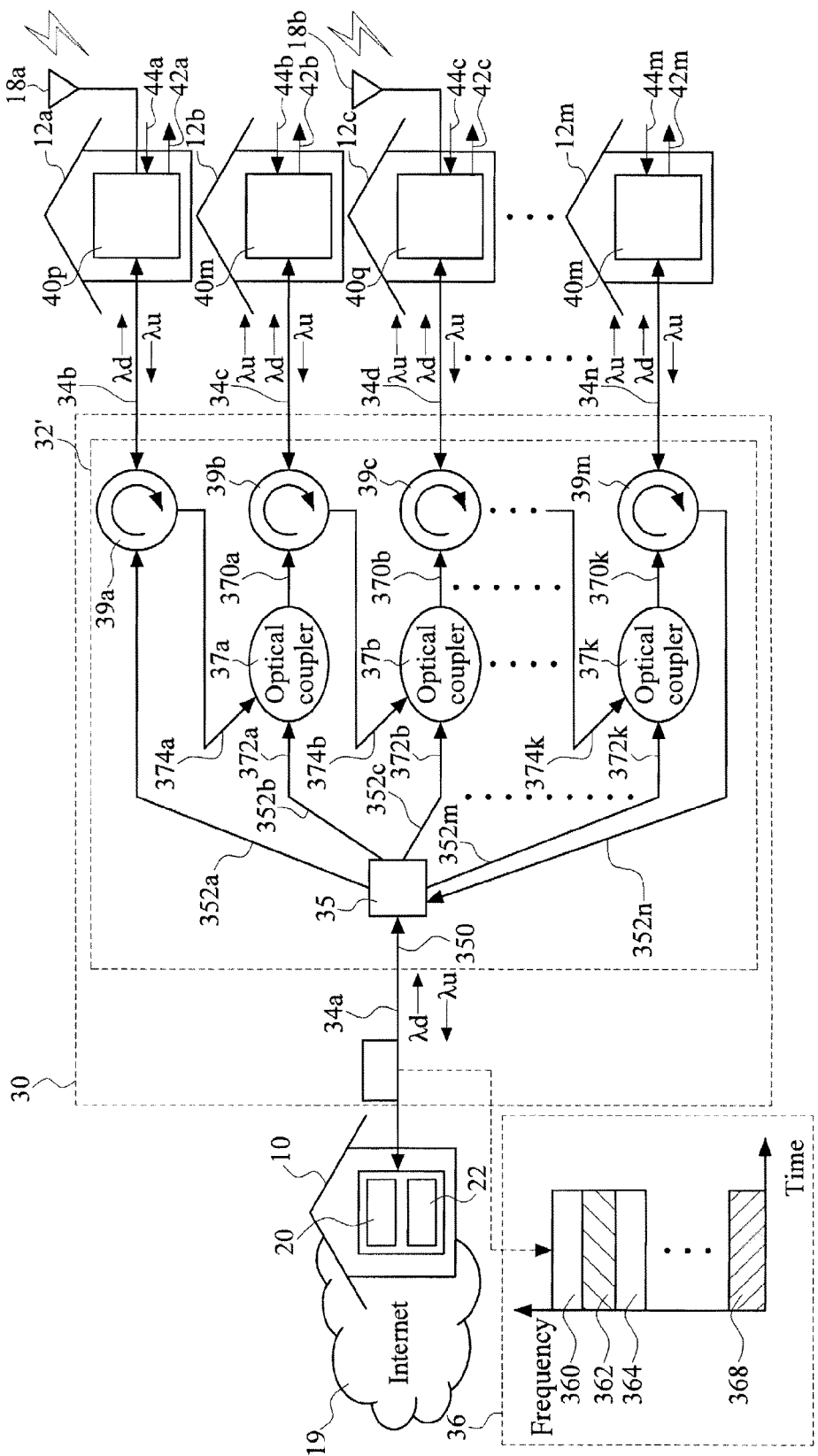
FIG. 8 is a schematic architectural view of another embodiment of an optical circulator assembly when being applied to a PON system supporting wireless communication.

The application example of the optical circulator assembly 32' of FIG. 7 is described with reference to FIG. 8, and FIG. 8 is a schematic architectural view of another embodiment of an optical circulator assembly when being applied to a PON system supporting wireless communication. In FIG. 8, in order to prevent the drawing from being too complicated, the numerals of the first splitting ends 372a, 372b, and 372k, the second splitting ends 374a, 374b, and 374k, the combining ends 370a, 370b, and 370k, and the branch ends 352b, 352c, and 352m are omitted. As seen from FIG. 8, the PON system comprises an OLT 20, an ODN 30, and a plurality of ONUs 40m, 40p, and 40q.

The OLT 20 is used to send a downstream optical signal $\lambda_d$ and receive an upstream optical signal $\lambda_u$. The ODN comprises an optical circulator assembly 32' and n optical fibers 34a, 34b, 34c, 34d, and 34n, in which n is a positive integer greater than 2. The optical fibers 34a, 34b, 34c, 34d, and 34n are connected to the optical circulator assembly 32' in sequence. The first optical fiber 34a is connected to the OLT 20 and transmits the optical signals $\lambda_d$ and $\lambda_u$. The ONUs 40m, 40p, and 40q are respectively connected to the second, ... $n^{th}$ optical fibers 34b, 34c, 34d, and 34n. Each ONU 40m, 40p, or 40q receives and processes the optical signals $\lambda_d$ and $\lambda_u$ from the correspondingly connected optical fiber, and generates and then transmits the upstream optical signal $\lambda_u$ back to the corresponding second, ... $n^{th}$ optical fiber 34b, 34c, 34d, or 34n. At least one of the ONUs 40m, 40p, and 40q is configured with a remote antenna 18a or 18b, and the ONU 40p or 40q configured with the remote antenna 18a or 18b combines data received by the remote antenna 18a or 18b with the upstream optical signal $\lambda_u$.

Three types of ONUs 40m, 40p, and 40q are applied to the PON system supporting wireless communication shown in FIG. 8, the first type is the ONU 40p corresponding to the second optical fiber 34b, the second type is the ONU 40m not corresponding to the second optical fiber 34b and not configured with the remote antenna 18a or 18b, and the third type is the ONU 40q not corresponding to the second optical fiber 34b but configured with the remote antenna.

Figure 9A:
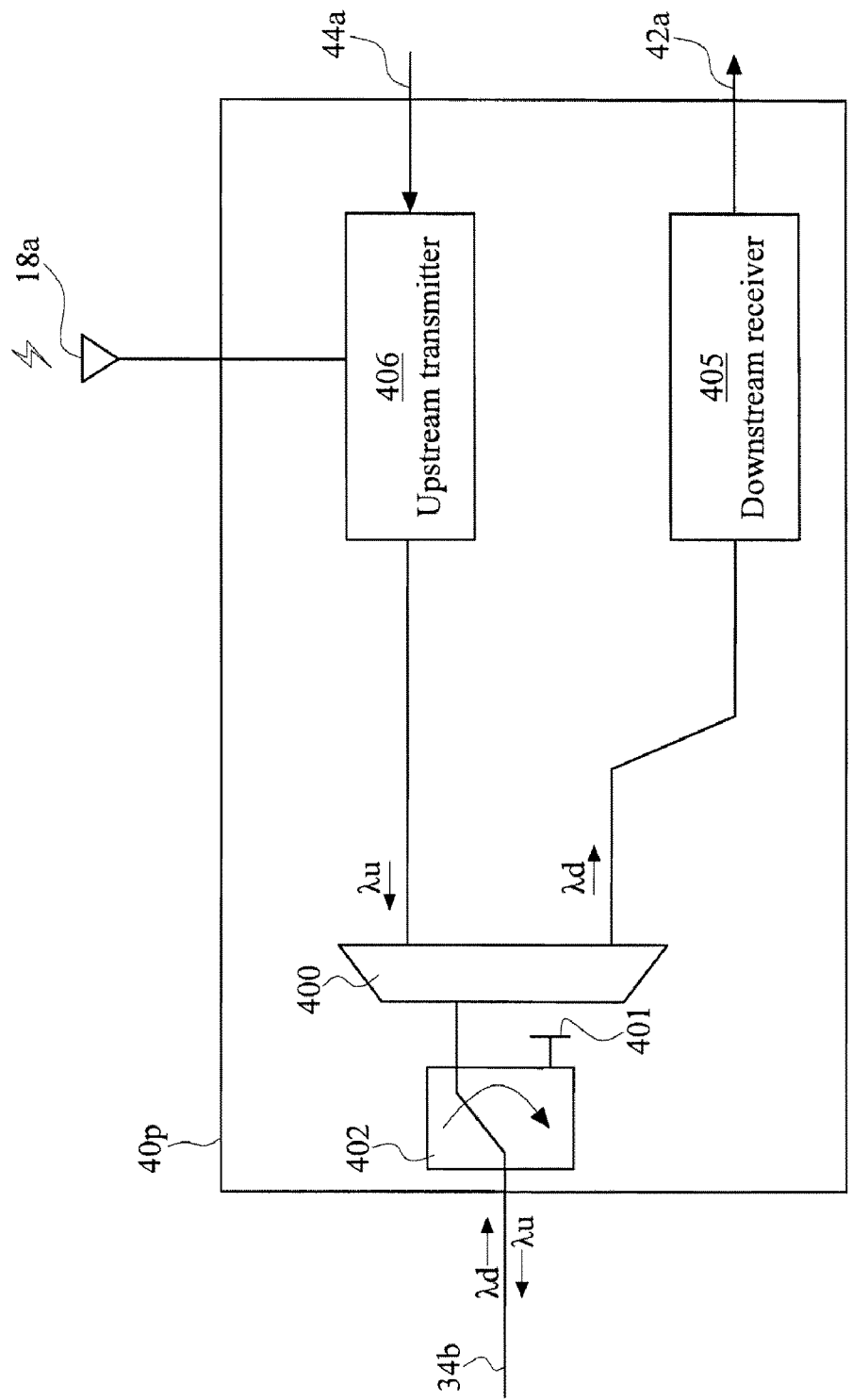
FIG. 9A is a schematic architectural view of another embodiment of an ONU.

A block diagram of the structure of the first type of ONU, that is, the ONU 40p, is shown in FIG. 9A, and FIG. 9A is a schematic architectural view of another embodiment of an ONU. The ONU of FIG. 9A is described by taking the user end 12a corresponding to the second optical fiber as an example. The ONU is just configured with the remote antenna 18a. The difference between the embodiment of FIG. 9A and the embodiment of FIG. 4B is that, the ONU 40p of the embodiment of FIG. 9A does not need to transmit back the received downstream optical signal $\lambda_d$, so that the reflecting mirror 409 (referring to FIG. 4B) is omitted. The ONU 40p comprises an optical switch 402, a first reflecting mirror 401, a CWDM 400, a downstream receiver 405, and an upstream transmitter 406. Connection relationships among the elements and motions thereof are not described repeatedly. In addition, if the ONU 40p connected to the second optical fiber 34b is not configured with the remote antenna 18a, the remote antenna 18a in FIG. 9A is omitted.

The architecture of the second type of ONU, that is, the ONU 40m, is shown in FIG. 4D, so it is not described repeatedly. The ONU 40m is configured on the user end 12b or 12m that does not have the remote antenna 18a or 18b.

Figure 9B:
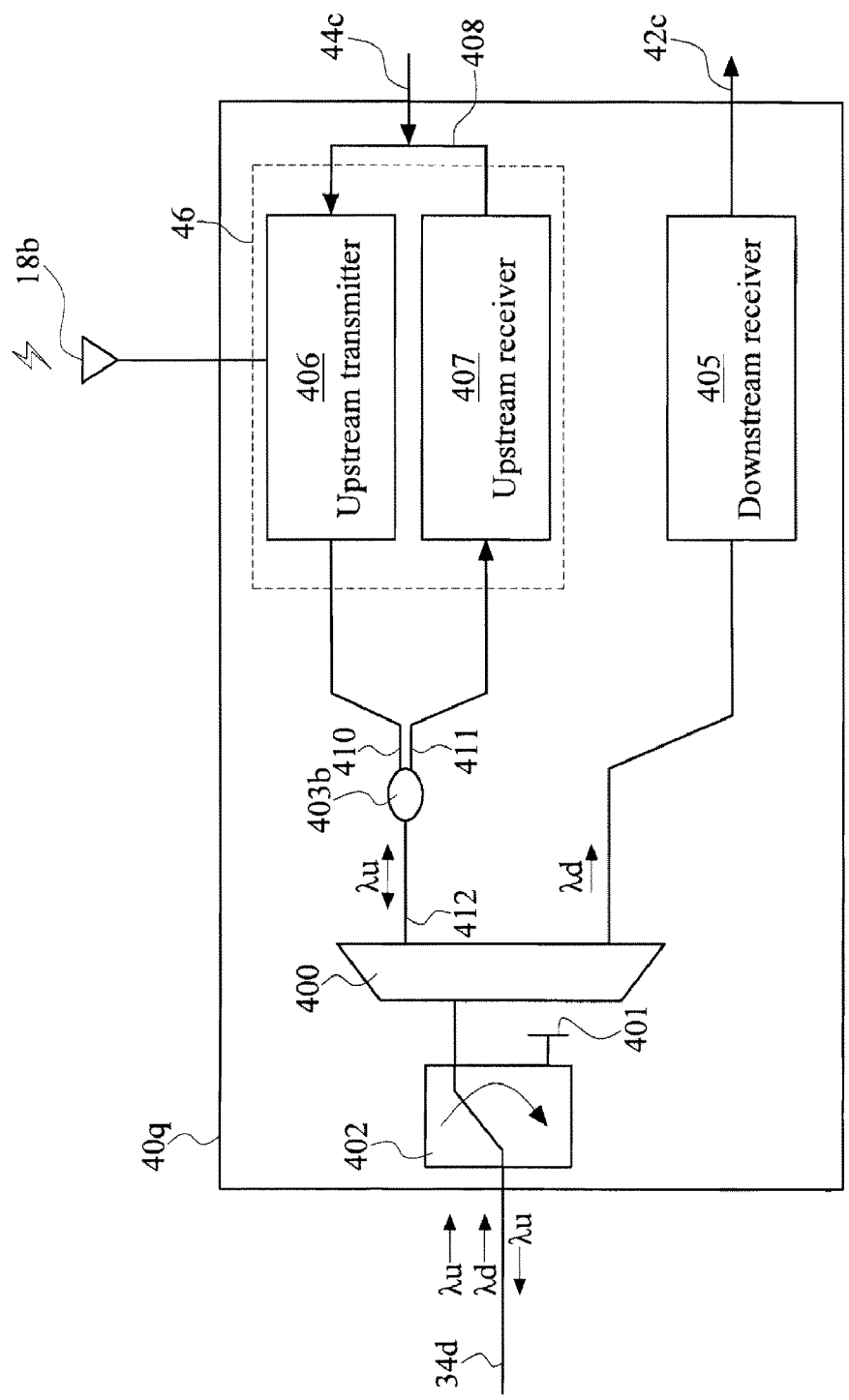
FIG. 9B is a schematic architectural view of another embodiment of an ONU.

A schematic structural view of the third type of ONU, that is, the ONU 40q is shown in FIG. 9B, and FIG. 9B is a schematic architectural view of another embodiment of an ONU n. As compared with the embodiment of FIG. 9A, the embodiment of FIG. 9B further comprises an upstream receiver 407 and a second optical coupler 403b. The motions of each element within the ONU 40q have been described above, which thus are not described repeatedly here.

Figure 9C:
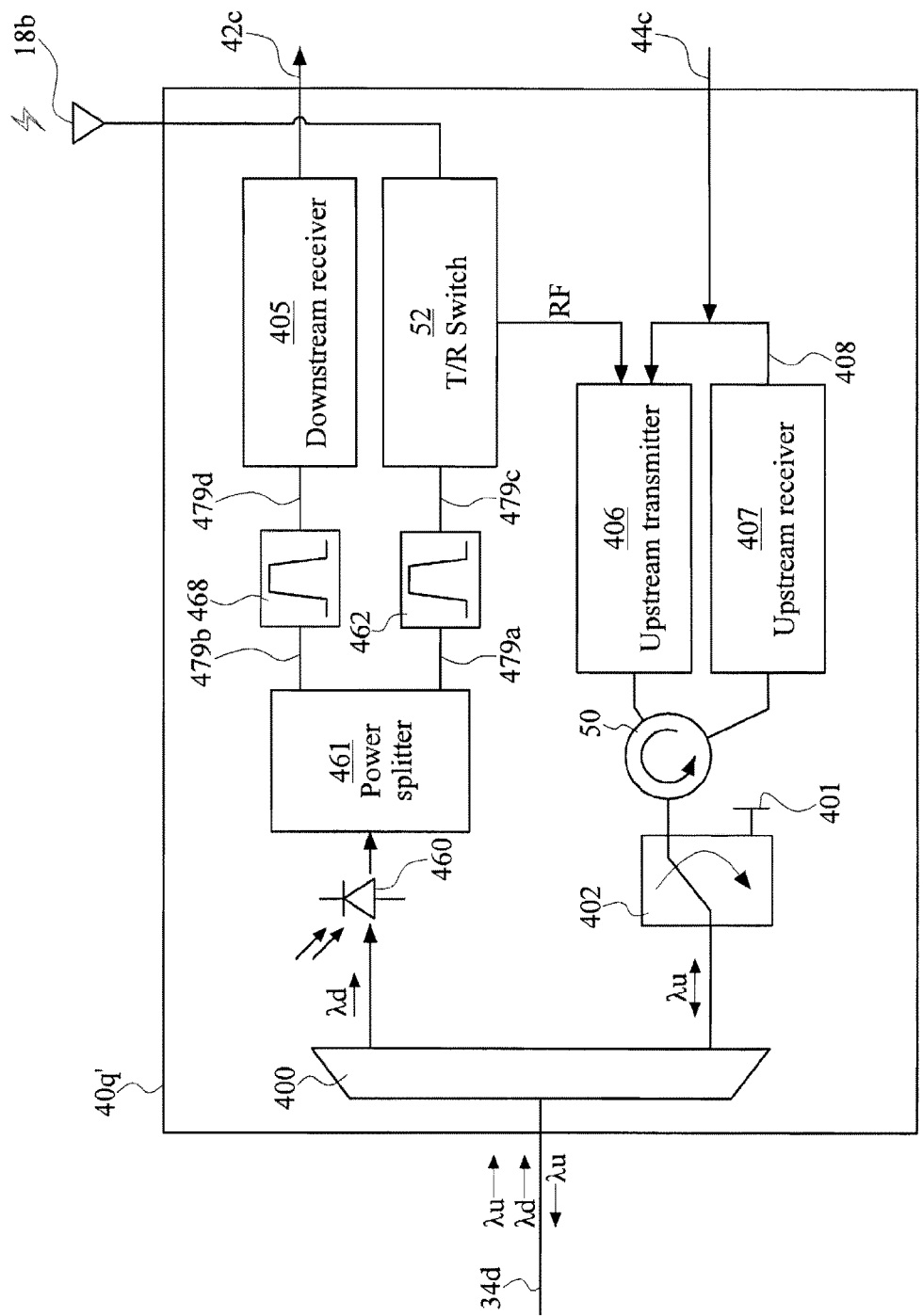
FIG. 9C is schematic architectural view of another embodiment of an ONU.

Lastly, please refer to FIG. 9C which is a schematic architectural view of another embodiment of an ONU. The embodiment of ONU is adapted to any ONU not corresponding to the second optical fiber 34b but configured with the remote antenna 18a, 18b in FIG. 8. According to FIG. 8, the embodiment of ONU is adapted to the ONU 40q. Hereinafter, the embodiment of ONU is annotated with 40q'.

Referring to FIG. 9C, the ONU 40q' is capable to receive RF signals not only from the remote antenna 18b, but also from the OLT 20. In the other words, the ONU 40q' receives optical signals from the fourth optical fiber 34d including downstream optical signal $\lambda_d$ from the OLT 20 and upstream optical signal $\lambda_u$ from previous (upstream) ONU 40p, 40m. Wherein, the downstream optical signal from the OLT 20 may comprise RF signals. Then, the ONU 40q' processes the received signals from the fourth optical fiber 34d and outputs the processed signals via antenna 18b or electrical connection 42c. In addition, the ONU 40q' receives and processes both RF signal from the antenna 18b and the electrical signal transmitted from upstream connection 44c and then outputs the processed signals via the fourth optical fiber 34d.

The ONU 40q' comprises a CWDM 400, an optical switch 402, a first reflecting mirror 401, a counterclockwise circulator 50, an upstream receiver 407, an upstream transmitter 406, a photoelectric element 460, a power splitter 461, a band pass filter 462, a band stop filter 468, a downstream receiver 405 and a transmitting/receiving switch (T/R switch) 52.

The CWDM 400 receives the optical signals $\lambda_u$ and $\lambda_d$ and splits the received optical signals $\lambda_u$ and $\lambda_d$ into the upstream optical signal $\lambda_u$ and the downstream optical signal $\lambda_d$. The split upstream optical signal $\lambda_u$ is guided to the optical switch 402 while the split downstream optical signal $\lambda_d$ is guided to the photoelectric converting element 460.

As for the downstream optical signal $\lambda_u$ from the fourth optical fiber 34d, it may include data and RF signal from the OLT 20 as mentioned above. After split by the CWDM 400, the downstream optical signal $\lambda_u$ is converted into a downstream electrical signal by the photoelectric converting element 460. The power splitter 461 splits the downstream electrical signal into two ninth electrical signal 479a, 479b and then transmits the ninth electrical signal 479a, 479b to the band pass filter 462 and the band stop filter 468, respectively.

The band pass filter 462 filters the ninth electrical signal 479a to enable the ninth electrical signal 479a within the predetermined frequency band range (RF band) to pass through, so as to form a passed electrical 479c. As mentioned above, the passed electrical signal 479c is RF signal which is sent from the OLT 20. Then, the T/R switch 52 transmits the passed electrical 479c (RF signal) through the antenna 18b.

The band stop filter 468 is used to perform a band stop on the ninth electrical signal 479b within the predetermined frequency band (wireless frequency band) and then output a stopped electrical signal 479d. The stopped electrical signal 479d is data signal from OLT 20. The downstream receiver 405 receives and processes the stopped electrical signal 479d and then outputs the processed electrical signal through downstream connection 42c.

In regard to the upstream optical signal $\lambda_u$, the optical switch 402 receives the upstream optical signals $\lambda_u$ and normally guides the upstream optical signals $\lambda_u$ toward the counterclockwise circulator 50. When being power off, the optical switch 402 guides the upstream optical signals $\lambda_u$ toward the first reflecting mirror 401. Therefore, the first reflecting mirror 401 reflects the upstream optical signals $\lambda_u$ back to the CWDM 400 and the fourth optical fiber 34d. Through the configuration of the optical switch 402 and the reflecting mirror 401, if the user end 12c corresponding to the ONU 40c is power off (or black out), the upstream optical signals $\lambda_u$ still can be transmitted back to the ODN 30, such that the communication of the entire system is not affected. Although the ONU 40q' has the optical switch 402 and the first reflecting mirror 401, the design spirit may still be achieved without the two elements.

The counterclockwise circulator (optical circulator) 50 guides the upstream optical signal $\lambda_u$ from the optical switch 402 to the upstream receiver 407. The counterclockwise circulator 50 also guides the optical signal from the upstream transmitter 406 to the optical switch 402. The upstream receiver 407 receives and converts the received upstream optical signal $\lambda_u$ into a received electrical signal 408, and then sends the received electrical signal 408 to the upstream transmitter 406.

Since the user end 12c where the ONU 40q' is configured has the remote antenna 18b, the RF signal from the antenna 18b is received by the T/R switch 52. The T/R switch 52 transmits the received RF signal from the antenna 18b to the upstream transmitter 406.

The upstream transmitter 406 combines the electrical signal to be uploaded from upstream connection 44c with the received electrical signal 408 and the RF signal from the T/R switch 52 to generate the upstream optical signal $\lambda_u$, and then transmits the upstream optical signal $\lambda_u$ to the counterclockwise circulator 50. The upstream optical signal $\lambda_u$ from the upstream transmitter 406 is guided back to the fourth optical fiber 34d through the counterclockwise circulator 50, the optical switch 402 and the CWDM 400 in sequence.

Through the structure of the PON system supporting wireless communication, the optical circulator assembly guides the optical signals, and the ONUs are appropriately designed, so that the PON system can support the wireless communication, and the detailed structure of the ONUs can be adjusted according to the situation whether each user end needs to support the wireless communication or not. Therefore, the PON system is more convenient and flexible in applications. In addition, no optical splitter is adopted in the ODN according to the present invention, such that an intensity of the downstream optical signal sent from the OLT is not split into a plurality of portions by the optical splitter, and thus, the OLT is enabled to select a luminous element (laser) with a moderate luminous intensity, thereby lowering the specification of the selected parts. Furthermore, the PON system may adopts one wavelength of the upstream optical signal and one wavelength of the downstream optical signal, such that widely applied luminous elements (lasers) can be used, thereby lowering the entire construction cost.

The invention being thus described above, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A passive optical network (PON) system supporting wireless communication, comprising:

an optical line terminal (OLT), for sending a downstream optical signal and receiving an upstream optical signal;

an optical distribution network (ODN), having an optical circulator assembly and first, second, . . . $n^{th}$ optical fibers, wherein n is a positive integer greater than 2, the optical fibers are connected to the optical circulator assembly in sequence, the first optical fiber is connected to the OLT and transmits the downstream optical signal and the upstream optical signal, and the optical circulator assembly guides the optical signals from a $i^{th}$ optical fiber to a $(i+1)^{th}$ optical fiber, i is a positive integer and i<n ; and a plurality of optical network units (ONUs), connected to the second, . . . $n^{th}$ optical fibers respectively, wherein each of the ONUs receives the optical signals from the corresponding second, . . . $n^{th}$ optical fiber, generates the upstream optical signal, and then transmits the upstream optical signal back to the corresponding second, . . . $n^{th}$ optical fiber; each of the ONUs corresponding to the second, . . . $(n-1)^{th}$ optical fiber processes the received downstream optical signal and transmits the processed downstream optical signal back to the corresponding second, . . . $(n-1)^{th}$ optical fiber; at least one of the ONUs is configured with a remote antenna, and the ONU configured with the remote antenna combines data received by the remote antenna with the upstream optical signal, wherein the ONU corresponding to the second optical fiber comprises an upstream transmitter for converting an electrical signal to be uploaded to generate the upstream optical signal and transmitting the upstream optical signal back to the second optical fiber; and wherein each of the ONUs respectively connected to the third, . . . $n^{th}$ optical fiber comprises an upstream receiver and an upstream transmitter; the upstream receiver receives and converts the upstream optical signal into a received electrical signal; and the upstream transmitter combines an electrical signal to be uploaded with the received electrical signal to generate the upstream optical signal, and transmits the upstream optical signal back to the corresponding second, . . . $n^{th}$ optical fiber.

2. The PON system according to claim 1, wherein a wavelength of the upstream optical signal is different from that of the downstream optical signal.

3. The PON system according to claim 2, wherein each of the ONUs comprises a coarse wavelength division multiplexer (CWDM) for splitting the received optical signals into the upstream optical signal and the downstream optical signal.

4. The PON system according to claim 3, wherein each of the ONUs comprises an optical switch and a first reflecting mirror; the optical switch receives the optical signals; upon being powered on, the optical switch guides the optical signals to the CWDM; upon being powered off, the optical switch guides the optical signals to the first reflecting mirror; the first reflecting mirror reflects the optical signals back to the optical switch, and the optical switch then guides the optical signals back to the second, . . . $n^{th}$ optical fiber corresponding to the ONU.

5. The PON system according to claim 3, wherein each of the ONUs comprises a first optical coupler, a second reflecting mirror, and a downstream receiver; the first optical coupler receives the downstream optical signal and splits the downstream optical signal to the second reflecting mirror and the downstream receiver; the second reflecting mirror reflects the downstream optical signal from the first optical coupler back to the first optical coupler; and the downstream receiver performs a decoding process on the downstream optical signal.

6. The PON system according to claim 3, wherein each of the ONUs comprises a first optical coupler, a fiber grating filter, and a downstream receiver; the first optical coupler receives the downstream optical signal and splits the downstream optical signal to the fiber grating filter and the downstream receiver; the fiber grating filter reflects the downstream optical signal from the first optical coupler back to the first optical coupler; and the downstream receiver performs a decoding process on the downstream optical signal.

7. The PON system according to claim 1, wherein the upstream transmitter of the ONU configured with the remote antenna combines the data received by the remote antenna with the electrical signal to be uploaded and the received electrical signal to generate the upstream optical signal, and transmits the upstream optical signal back to the corresponding second, ... $n^{th}$ optical fiber.

8. The PON system according to claim 1, wherein each of the ONUs further comprises a second optical coupler having two splitting ends and one combining end; the combining end receives the upstream optical signal from the corresponding optical fiber; and the two splitting ends are respectively connected to the upstream receiver and the upstream transmitter.

9. The PON system according to claim 1, wherein each of the ONUs comprises:
   a photoelectric converting element, for converting the upstream optical signal from the corresponding optical fiber into a first electrical signal;
   a power splitter, for splitting the first electrical signal into a second electrical signal and a third electrical signal;
   a digital processing controller, for receiving the second electrical signal, and combining the second electrical signal with an electrical signal to be uploaded to output a fourth electrical signal;
   a first band pass filter, for filtering the third electrical signal to enable the third electrical signal within a predetermined frequency band range to pass through, so as to form a fifth electrical signal;
   an electrical coupler, for coupling the fourth electrical signal with the fifth electrical signal to form a sixth electrical signal; and
   an electro-optical converting element, for converting the sixth electrical signal into the upstream optical signal.

10. The PON system according to claim 9, wherein each of the ONUs further comprises a band stop filter for performing a band stop on the second electrical signal and then outputting the second electrical signal to the digital processing controller.

11. The PON system according to claim 10, wherein the band stop filter performs the band stop on the second electrical signal within the predetermined frequency band, and then outputs the second electrical signal.

12. The PON system according to claim 9, wherein the ONU configured with the remote antenna further comprises:
   a frequency shifter, for performing a frequency shift on the data received by the remote antenna;
   a second band pass filter, for filtering the frequency-shifted data to enable the frequency-shifted data within the predetermined frequency band range to pass through, so as to form a seventh electrical signal; and
   a combiner, for combining the fifth electrical signal with the seventh electrical signal to form an eighth electrical signal, wherein the electrical coupler couples the eighth electrical signal with the fourth electrical signal to form the sixth electrical signal.

13. The PON system according to claim 9, wherein the electrical coupler is a directional coupler.

14. The PON system according to claim 9, wherein the photoelectric converting element is a photo sensor.

15. The PON system according to claim 9, wherein the digital processing controller comprises:
   an analog to digital converter, for converting the second electrical signal into a digital signal;
   an orthogonal frequency division multiplexing (OFDM) demodulator, for demodulating the digital signal into a demodulated signal;
   a data access controller, for combining the demodulated signal with the electrical signal to be uploaded;
   an OFDM modulator, for performing an orthogonal modulation on a combined signal; and
   a digital to analog converter, for converting a modulated signal into an analog signal to output the analog signal as the fourth electrical signal.

16. The PON system according to claim 1, wherein the optical circulator assembly comprises first, second, ... $n^{th}$ circulators and n optical guides; the first, second, ... $n^{th}$ circulators are ring jointed with each other by the n optical guides; outer sides of the first, second, ... $n^{th}$ circulators are correspondingly opto-connected to the first, second, ... $n^{th}$ optical fibers respectively; and each circulator guides the optical signals from one of opto-connections to the next opto-connection.

17. A passive optical network (PON) system supporting wireless communication, comprising:
   an optical line terminal (OLT), for sending a downstream optical signal and receiving an upstream optical signal;
   an optical distribution network (ODN), having an optical circulator assembly and n optical fibers, wherein n is a positive integer greater than 2, the optical fibers are connected to the optical circulator assembly in sequence, and the first optical fiber is connected to the OLT and transmits the downstream optical signal and the upstream optical signal; and
   a plurality of optical network units (ONUs), connected to the second, ... $n^{th}$ optical fibers respectively, wherein each of the ONUs receives and processes the optical signals from the optical fiber correspondingly connected to the ONU, generates the upstream optical signal, and then transmits the upstream optical signal back to the corresponding second, ... $n^{th}$ optical fiber; and at least one of the ONUs is configured with a remote antenna, and the ONU configured with the remote antenna combines data received by the remote antenna with the upstream optical signal,
   wherein the ONU connected to the second optical fiber comprises an upstream transmitter for converting an electrical signal to be uploaded to generate the upstream optical signal and transmitting the upstream optical signal back to the second optical fiber; and
   wherein each of the ONUs connected to the third, ... $n^{th}$ optical fiber respectively comprises an upstream receiver and an upstream transmitter; the upstream receiver receives and converts the upstream optical signal into a received electrical signal; and the upstream transmitter combines an electrical signal to be uploaded with the received electrical signal to generate the upstream optical signal, and transmits the upstream optical signal back to the corresponding third, ... $n^{th}$ optical fiber.

18. The PON system according to claim 17, wherein each of the ONUs comprises a coarse wavelength division multiplexer (CWDM) for splitting the received optical signals into the upstream optical signal and the downstream optical signal.

19. The PON system according to claim 18, wherein each of the ONUs comprises an optical switch and a first reflecting mirror; the optical switch receives the optical signals; upon being powered on, the optical switch guides the optical signals to the CWDM; upon being powered off, the optical switch guides the optical signals to the first reflecting mirror; and the first reflecting mirror reflects the optical signals back to the optical switch, and the optical switch then guides the optical signals back to the optical fiber connected to the ONU.

20. The PON system according to claim 18, wherein each of the ONUs comprises a downstream receiver for performing a decoding process on the downstream optical signal from the CWDM.

21. The PON system according to claim 17, wherein the upstream transmitter of the ONU configured with the remote antenna combines the data received by the remote antenna with the electrical signal to be uploaded and the received electrical signal to generate the upstream optical signal, and transmits the upstream optical signal back to the corresponding second, . . . $n^{th}$ optical fiber.

22. The PON system according to claim 17, wherein each of the ONUs further comprises a second optical coupler having two splitting ends and one combining end; the combining end receives the upstream optical signal from the corresponding optical fiber; and the two splitting ends are respectively connected to the upstream receiver and the upstream transmitter.

23. The PON system according to claim 17, wherein each of the ONUs comprises:
 a photoelectric converting element, for converting the upstream optical signal from the corresponding optical fiber into a first electrical signal;
 a power splitter, for splitting the first electrical signal into a second electrical signal and a third electrical signal;
 a digital processing controller, for receiving the second electrical signal, and combining the second electrical signal with an electrical signal to be uploaded to output a fourth electrical signal;
 a first band pass filter, for filtering the third electrical signal to enable the third electrical signal within a predetermined frequency band range to pass through, so as to form a fifth electrical signal;
 an electrical coupler, for coupling the fourth electrical signal with the fifth electrical signal to form a sixth electrical signal; and
 an electro-optical converting element, for converting the sixth electrical signal into the upstream optical signal.

24. The PON system according to claim 23, wherein each of the ONUs further comprises a band stop filter for performing a band stop on the second electrical signal and then outputting the second electrical signal to the digital processing controller.

25. The PON system according to claim 23, wherein the ONU configured with the remote antenna further comprises:
 a frequency shifter, for performing a frequency shift on the data received by the remote antenna;
 a second band pass filter, for filtering the frequency-shifted data to enable the frequency-shifted data within the predetermined frequency band range to pass through, so as to form a seventh electrical signal; and
 a combiner, for combining the fifth electrical signal with the seventh electrical signal to form an eighth electrical signal, wherein the electrical coupler couples the eighth electrical signal with the fourth electrical signal to form the sixth electrical signal.

26. The PON system according to claim 23, wherein the digital processing controller comprises:
 an analog to digital converter, for converting the second electrical signal into a digital signal;
 an orthogonal frequency division multiplexing (OFDM) demodulator, for demodulating the digital signal into a demodulated signal;
 a data access controller, for combining the demodulated signal with the electrical signal to be uploaded;
 an OFDM modulator, for performing an orthogonal modulation on a combined signal; and
 a digital to analog converter, for converting a modulated signal into an analog signal to output the analog signal as the fourth electrical signal.

27. The PON system according to claim 17, wherein the downstream optical signal sent from the OLT comprises a data signal and a RF signal, and the ONU configured with the remote antenna transmits the RF signal through the remote antenna.

28. The PON system according to claim 27, wherein each of the ONUs connected to one of the third, . . . $n^{th}$ optical fiber and configured with the remote antenna comprises:
 a CWDM, receiving the optical signals from the corresponding optical fiber and splitting the received optical signals into a upstream optical signal and downstream optical signal;
 a photoelectric converting element, receiving and converting the split downstream optical signal into an downstream electrical signal;
 a power splitter, splitting the downstream electrical signal into two ninth electrical signals;
 a band pass filter, filtering one of the ninth electrical signals to pass the RF signal within a predetermined frequency band range to form a passed electrical signal;
 a transmitting and receiving switch; transmitting the passed electrical signal through the remote antenna;
 a band stop filter, stopping the other one of the ninth electrical signals within the predetermined frequency band range to form a stopped electrical signal;
 a downstream receiver, receiving and processing the stopped electrical signal;
 a first reflecting mirror;
 a circulator;
 an optical switch, receiving the split upstream optical signal and normally guiding the split upstream optical signal to the circulator, upon powered off, the optical switch guiding the split upstream optical signal to the first reflecting mirror, the reflecting mirror reflecting the received upstream optical signal back to the corresponding optical fiber;
 an upstream receiver, the circulator guiding the upstream optical signal from the optical switch to the upstream receiver, the upstream receiver receiving and converting the upstream optical signal from the circulator into a received electrical signal; and
 an upstream transmitter, receiving and combining the received electrical signal with the data received by the remote antenna and then transmitting the combined signal to the circulator, the circulator guiding the combined signal to the optical switch.

29. The PON system according to claim 17, wherein the optical circulator assembly comprises:
 an optical splitter, having one joining end and n branch ends, wherein n is a positive integer greater than 2, the joining end is opto-connected to the first optical fiber, the optical splitter splits the downstream optical signal from the first optical fiber and then guides the downstream optical signal to the second, . . . $n^{th}$ branch ends, and combines the upstream optical signal from the second, . . . $n^{th}$ branch ends respectively and then guides the upstream optical signal to the joining end;
 (n−2) optical couplers, each having a combining end, a first splitting end, and a second splitting end, wherein the second, . . . (n−1)$^{th}$ branch ends are respectively connected to the first splitting ends of the first, second, . . . (n−2)$^{th}$ optical couplers, and each optical coupler couples the optical signals from the first and second splitting ends and guides the optical signal to the combining end; and
 (n−1) circulators, wherein first, second, . . . (n−1)$^{th}$ circulators are respectively connected to the second, third . . .

$n^{th}$ optical fibers; the first circulator is connected to the first branch end; the first, second, ... $(n-2)^{th}$ circulators are respectively connected to the second splitting ends of the first, second, ... $(n-2)^{th}$ optical couplers; the combining ends of the first, second, ... $(n-2)^{th}$ optical couplers are respectively connected to the second, ... $(n-1)^{th}$ circulators; the $(n-1)^{th}$ circulator is connected to the $n^{th}$ branch end; the first circulator guides the downstream optical signal from the first branch end to the second optical fiber, and guides the upstream optical signal from the second optical fiber to the correspondingly connected second splitting end; the second, ... $(n-2)^{th}$ circulators respectively guide the optical signals from the correspondingly connected combining ends to the third, ... $(n-1)^{th}$ optical fibers, and guide the upstream optical signals from the third, ... $(n-1)^{th}$ optical fibers to the correspondingly connected second splitting ends; and the $(n-1)^{th}$ circulator guides the optical signal from the correspondingly connected combining end to the $n^{th}$ optical fiber, and guides the upstream optical signal from the $n^{th}$ optical fiber to the $n^{th}$ branch end.

* * * * *